US012704619B2

(12) United States Patent
Wang et al.

(10) Patent No.: US 12,704,619 B2
(45) Date of Patent: Aug. 11, 2026

(54) USER EQUIPMENT COORDINATED RADAR SENSING

(71) Applicant: GOOGLE LLC, Mountain View, CA (US)

(72) Inventors: Jibing Wang, San Jose, CA (US); Erik Richard Stauffer, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 461 days.

(21) Appl. No.: 18/036,061

(22) PCT Filed: Sep. 29, 2021

(86) PCT No.: PCT/US2021/052507
§ 371 (c)(1),
(2) Date: May 9, 2023

(87) PCT Pub. No.: WO2022/103504
PCT Pub. Date: May 19, 2022

(65) Prior Publication Data

US 2024/0004049 A1 Jan. 4, 2024

Related U.S. Application Data

(60) Provisional application No. 63/113,596, filed on Nov. 13, 2020.

(51) Int. Cl.

*G01S 13/00* (2006.01)
*G01S 13/42* (2006.01)
*G01S 13/931* (2020.01)

(52) U.S. Cl.

CPC ........... *G01S 13/003* (2013.01); *G01S 13/42* (2013.01); *G01S 13/931* (2013.01)

(58) Field of Classification Search

CPC ........ G01S 13/003; G01S 13/06; G01S 13/42; G01S 13/48; G01S 13/931; G01S 7/023; G01S 7/358; H04L 5/0048
See application file for complete search history.

(56) References Cited

U.S. PATENT DOCUMENTS

2004/0257270 A1 12/2004 Poullin
2014/0009275 A1* 1/2014 Bowers ................ G06Q 20/145 340/436

(Continued)

FOREIGN PATENT DOCUMENTS

CN 106872968 A 6/2017
CN 107367719 A 11/2017

(Continued)

OTHER PUBLICATIONS

International Search Report and Written Opinion mailed Dec. 23, 2021 for corresponding International Application No. PCT/US2021/052507, 25 pages.

(Continued)

*Primary Examiner* — Timothy X Pham

(57) ABSTRACT

A user-equipment-coordination set in a cellular network includes multiple UEs for performing coordinated radar sensing. A first UE determines a configuration to coordinate other UEs to detect an object. The first UE uses the configuration to configure a second UE to transmit a first radar signal and a third UE to detect the first radar signal. The first UE receives first radar signal samples from the third UE based on the third UE receiving the first radar signal in multiple reflection states. The first UE filters the first radar signal samples to remove samples associated with interference from the first radar signal received in a first reflection state. The first UE determines object location information based on at least the filtered first radar signal samples.

13 Claims, 8 Drawing Sheets

(56) References Cited

U.S. PATENT DOCUMENTS

| | | | |
|---|---|---|---|
| 2018/0031697 A1 | 2/2018 | Harris et al. | |
| 2019/0293781 A1 | 9/2019 | Bolin et al. | |
| 2019/0369233 A1 | 12/2019 | Niesen et al. | |
| 2020/0025866 A1 | 1/2020 | Gulati et al. | |
| 2020/0187126 A1 | 6/2020 | Bolin et al. | |
| 2020/0322962 A1 | 10/2020 | Wang et al. | |
| 2020/0404598 A1 | 12/2020 | Landis et al. | |
| 2021/0116557 A1 | 4/2021 | Ljung et al. | |
| 2021/0190905 A1* | 6/2021 | Roger | G01S 13/536 |
| 2021/0212044 A1* | 7/2021 | Ryu | H04W 72/0453 |

FOREIGN PATENT DOCUMENTS

| | | |
|---|---|---|
| CN | 109001693 A | 12/2018 |
| WO | 2009039161 A2 | 3/2009 |
| WO | 2014011552 A1 | 1/2014 |
| WO | 2014011556 A1 | 1/2014 |
| WO | 2017207042 A1 | 12/2017 |
| WO | 2020057748 A1 | 3/2020 |
| WO | 2020216522 A1 | 10/2020 |
| WO | 2021004625 A1 | 1/2021 |
| WO | 2021087942 A1 | 5/2021 |

OTHER PUBLICATIONS

International Preliminary Report on Patentability mailed Feb. 21, 2023 for corresponding International Application No. PCT/US2021/052507, 28 pages.

Garry J.L. et al., “Direct Signal Suppression Schemes for Passive Radar”, 2015 Signal Processing Symposium, Warsaw University of Technology; Jun. 10, 2015, pp. 1-5.

Guo, J. et al., “A Robust Spatial DPI Suppression Algorithm for GSM-Based Passive Detection System”, IEEE 2011 7th International Conference on Wireless Communications, Networking and Mobile Computing; Sep. 23, 2011; pp. 1-4.

Hack, D. et al. “Detection in Passive MIMO Radar Networks”, IEEE Transactions on Signal Processing, vol. 62, No. 11; Jun. 1, 2014; pp. 2999-3012.

Communication pursuant to Article 94(3) EPC mailed Nov. 26, 2025 for EP Application No. 21798874.0, 6 pages.

* cited by examiner

USER EQUIPMENT COORDINATED RADAR SENSING

CROSS-REFERENCE TO RELATED APPLICATIONS

The present application is a U.S. National Stage under 35 U.S.C. § 371 of International Patent Application Serial No. PCT/US2021/052507, entitled "USER EQUIPMENT COORDINATED RADAR SENSING" and filed on Sep. 29, 2021, which claims priority to U.S. Provisional Application No. 63/113,596, entitled "USER EQUIPMENT COORDINATED RADAR SENSING" and filed on Nov. 13, 2020, the entireties of which are incorporated by reference herein.

BACKGROUND

Complex systems for detecting objects, tracking objects, and mapping surfaces frequently employ radar. While radar components have traditionally been implemented in dedicated radar systems, such as weather surveillance radar, speed guns, and air-traffic-control equipment, technological advances have enabled radar technology to integrate into non-dedicated electronic devices, such as cellular-based user equipment (UE). Efficient radar sensing typically requires full-duplex processing, which may not be practical for consumer electronic devices due to network resource limitations, hardware and processing limitations, and other factors. Consumer devices may have volume restrictions on the size of dedicated radar sensing components, which can limit performance. Also, conventional radar systems generally use custom-designed radar-specific hardware to generate radar-specific signals. This hardware can be expensive and require additional space in consumer devices.

SUMMARY OF EMBODIMENTS

In accordance with one aspect, a method, by a first user equipment (UE) of a group of UEs in a cellular network, includes the first UE determining a configuration to coordinate the group of UEs to detect one or more objects using radar. The first UE configures a second UE of the group of UEs, based on the determined configuration, to transmit a first radar signal and a third UE of the group of UEs to detect the first radar signal. The first UE receives first radar signal samples from the third UE based on the third UE receiving the first radar signal in a set of reflection states. The first UE filters first radar signal samples to remove samples associated with interference from the third UE receiving the first radar signal in a first reflection state of the set of reflection states. The first UE determines object location information, based on at least the filtered first radar signal samples, in response to filtering the first radar signal samples. In at least some implementations, the first reflection state of the set of reflection states is a direct reception state where the third UE receives the first radar signal directly from the second UE, and wherein a second reflection state of the set of reflection states is a reflected state where the third UE receives the first radar signal reflected by one or more objects. In at least some implementations, the first UE and the third UE are a same user equipment, while in other implementations the third UE is a different user equipment from the first UE and the second UE.

In at least some implementations, determining the configuration includes at least one of the first UE (a) receiving the configuration from a base station or (b) generating the configuration locally at the first UE. Determining the configuration, in at least some implementations, further includes the first UE receiving an air interface resource allocation from a base station, the first UE determining a subset of air interface resources from the air interface resource allocation for transmission and reception of the first radar signal, and the first UE determining a waveform for the first radar signal.

In at least some implementations, configuring the second UE includes the first UE configuring the second UE to transmit, as the first radar signal, a Sounding Reference Signal (SRS) or a Random Access Channel (RACH) signal utilized by the second UE for cellular signaling. Configuring the second UE, in at least some implementations, further includes the first UE configuring the second UE to transmit the first radar signal using either millimeter-waves or terahertz waves. In some implementations, configuring the second UE to transmit the first radar signal includes the first UE sending a message to the second UE identifying a waveform to be utilized as the first radar signal and further identifying transmission parameters for transmitting the first radar signal.

In at least some implementations, configuring the third UE to detect the first radar signal includes the first UE sending a message to the third UE identifying a group of attributes associated with the first radar signal including a waveform attribute of the first radar signal and timing attributes associated with transmission of the first radar signal. Configuring the third UE to detect the first radar signal, in at least some implementations, further includes the first UE sending a message to the third UE including a beamforming configuration to be utilized by the third UE to mitigate interference from the second UE when the second UE transmits the first radar signal.

In at least some implementations, the method further includes the first UE receiving, from the second UE, second radar signal samples associated with the first radar signal transmitted by the second UE, wherein filtering the first radar signal samples includes the first UE canceling the second radar signal samples from the first radar signal samples. The method further includes, in at least some implementations, the first UE receiving an indication from a base station to form a user-equipment-coordination set (UECS) for coordinated radar sensing and object detection, and responsive to receiving the indication, the first UE forming the UECS with each remaining UE of the group of UEs. Forming the UECS, in at least some implementations, includes the first UE establishing a local wireless connection with the other UEs in the UECS and synchronizing with each remaining UE of the group of UEs according to a cellular network timing reference.

In at least some implementations, the method further includes the first UE configuring a fourth UE of the group of UEs to detect the first radar signal; the first UE receiving, from the fourth UE, third radar signal samples based on the fourth UE receiving the first radar signal; and the first UE refining the object location information based on the third radar signal samples. The method, in at least some implementations, further includes the first UE configuring a fourth UE of the group of UEs to transmit a second radar signal; the first UE receiving, from the third UE, fourth radar signal samples based on the third UE receiving the second radar signal in a group of reflection states; and the first UE refining the object location information based on the fourth radar signal samples.

In at least some implementations, the method further includes the first UE configuring the second UE to detect a third radar signal, the first UE configurating the third UE to transmit the third radar signal, the first UE receiving fifth radar signal samples from the second UE based on the second UE receiving the third radar signal, and the first UE refining the object location information based on the fifth radar signal samples.

In accordance with another aspect, a method, by a first user equipment (UE) of a group of UEs in a cellular network, includes the first UE receiving a configuration to detect a first radar signal transmitted by a second UE of the group of UEs. The first UE detects the first radar signal in a set of reflection states based on the configuration. The first UE generates first radar signal samples associated with the first radar signal responsive to detecting the first radar signal. The first UE filters the first radar signal samples to remove samples associated with interference from receiving the first radar signal in a first reflection state of the set of reflection states. The first UE transmits the filtered first radar signal samples to at least a third UE of the group of UEs. The configuration, in at least some implementations, includes a waveform attribute of the first radar signal and transmission timing attributes associated with the first radar signal. In at least some implementations, detecting the first radar signal includes the first UE configuring beamforming detection parameters based on the configuration to detect the first radar signal and mitigate interference from the second UE.

In at least some implementations, the method further includes the first UE receiving a configuration to transmit a second radar signal, and the first UE transmitting the second radar signal for reception by at least the second UE. The method further includes, in at least some implementations, the first UE generating second radar signal samples associated with the second radar signal, and the first UE transmitting the second radar signal samples to the third UE. In at least some implementations, the method further includes the first UE receiving an indication from a base station to form a user-equipment-coordination set (UECS) for coordinated radar sensing and object, and the first UE forming the UECS with each remaining UE of the group of UEs responsive to receiving the indication.

In accordance with yet another aspect, a method, by a first user equipment (UE) of a group of UEs in a cellular network, includes the first UE receiving, from a second UE of the group of UEs, a configuration to detect a radar signal transmitted by a third UE of the group of UE. The first UE detects a reflection of the radar signal by at least one object is based on the configuration. The first UE determines object location information associated with the at least one object. The first UE transmits the objection location information to at least a third UE of the group of UEs.

In accordance with a further aspect, a first UE including a wireless interface and a processor coupled to the wireless interface is configured to implement a method according to the methods described above.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
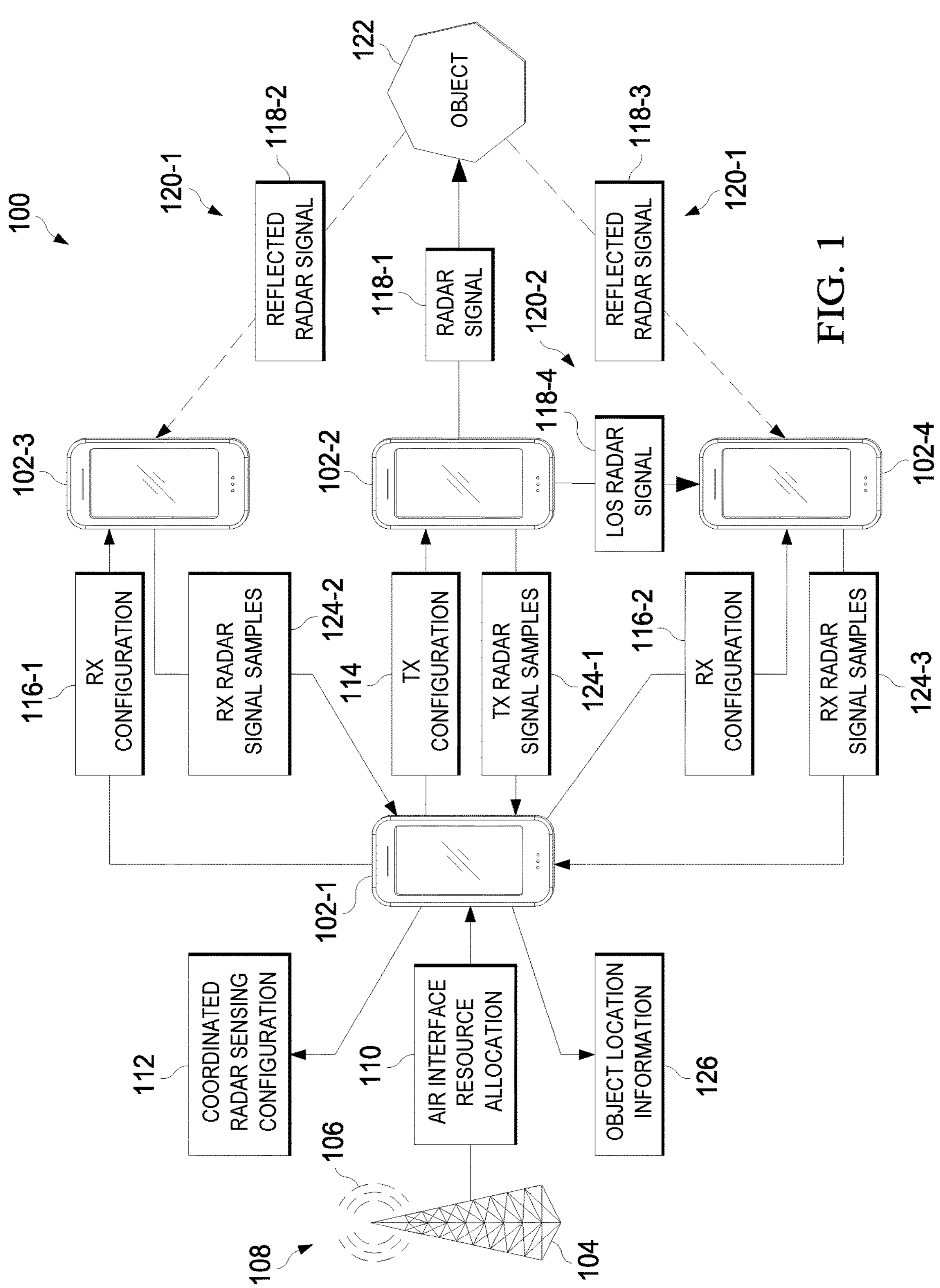
FIG. 1 is a diagram illustrating an example wireless communication system employing a selected set of UEs for performing coordinated radar sensing in accordance with some embodiments.

The implementation of radar technology in consumer devices, such as handheld UEs and automotive vehicles, is becoming increasingly desirable for remote object detection and awareness. For example, remote object detection and awareness are important aspects of autonomous driving and vehicle-to-everything (V2X) technology. In some implementations, dedicated radar hardware and processing components, such as those found in automotive vehicles, perform object detection and awareness. In other implementations, handheld UEs, which are part of a cellular-based wireless communication network, transmit and sense radar signals for object detection and awareness. Utilization of handheld UEs for radar signal transmission and sensing is advantageous since handheld UEs have become ubiquitous and can provide object detection and awareness information for many different objects across a large geographical area. Handheld UEs can be utilized as standalone radar sensing devices and/or used to augment radar sensing performed by other devices, such as automotive vehicles. Although advancements in technology make it possible to implement dedicated radar components in handheld UEs, the size and cost of such components limit their implementation in handheld UEs. Also, efficient radar processing typically requires full-duplex processing, which may not always be practical for handheld UEs. For example, network resources allocated to a UE, hardware/software of a handheld UE, and other network or device characteristics may limit the ability of a handheld UE to perform full-duplex radar processing.

The present disclosure describes embodiments of systems and methods for UE-coordination radar sensing that overcomes various problems associated with implementing radar sensing at UEs. As described in greater detail below, a set of UEs within a wireless communication network is selected to perform coordinated radar sensing to detect the presence of one or more objects in an environment local to the selected set of UEs. In at least some embodiments, this coordinated radar sensing includes distributing radar signal transmission and sensing across the set of UEs. For example, a first UE of the set of UEs transmits a radar signal and at least a second UE of the set of UEs receives reflections of the radar signal. One or more of the UEs process the received radar signal to detect objects within the vicinity of the set of UEs. In this way, a single UE is not required to perform full-duplex radar sensing, where a single UE is concurrently transmitting and receiving radar signals in the same frequency band.

A transmitting (TX) UEs transmits a radar signal based on a radar sensing configuration received from the base station or another UE (e.g., coordinating UE). The TX UE, in at least some embodiments, transmits standard radar waveforms having satisfactory self-correlation properties. In other embodiments, existing waveforms already transmitted by the TX UE, such as a Sounding Reference Signal (SRS) and a Random Access Channel (RACH) signal, are utilized as the radar signal as well. In at least some embodiments, the TX UE transmits the radar signal using sub-gigahertz bands, sub-GHz bands, millimeter wavelength (mmWave) bands, terahertz bands, etc. The transmitted radar signal is reflected, scattered, and/or absorbed by one or more objects, and one or more receiving (RX) UEs receive one or more reflected radar signal. In addition to the reflected signal, the RX UEs may also receive the line-of-sight (LOS) radar signal from the TX UE. If the coordinating UE configured the TX UE and RX UEs with beamforming configurations, the TX UE can steer transmitted beams away from the TX UE and the RX UEs can tune their receivers away from the TX UE to mitigate interference.

In at least some embodiments, the RX UEs receive transmitted radar signals and generate associated radar signal samples. The RX UEs manage the RX radar signal samples in one or more different ways. For example, one or more RX UEs transmit their RX radar signal samples to the coordinating UE without processing the radar signal samples. The RX radar signal samples, in at least some embodiments, are transmitted to the coordinating UE using cellular and/or non-cellular technologies (e.g., WLAN, peer-to-peer, etc.). The RX radar signal samples transmitted to the coordinating UE by the RX UEs, in at least some embodiments, include raw in-phase/quadrature (I/Q) samples of the received reflected radar signal and LOS radar signal. The TX UE, in at least some embodiments, transmits TX radar signal samples of the TX radar signal to the coordinating UE. The coordinating UE processes the RX and TX radar signal samples to reduce interference and determine object location information, such as a distance between the detected object and receiving UE and/or a distance between the detected object and TX UE. In at least some embodiments, the coordinating UE radar signal samples from more than one RX UE. The coordinating UE uses the additional RX radar signal samples to refine the object location. In another example, one or more of the RX UEs process their RX radar signal samples. For example, an RX UE reduces interference from RX radar signal samples and determines/estimates object location information, such as a distance between a detected object and the RX UE and/or the TX UE. In at least some embodiments, the RX UEs transmit their object location information to the other UEs of the UE-coordination set. The UEs receiving the additional object location information, in at least some embodiments, further refine the object location information determined by the UE using the additional object location information.

In at least some embodiments, one or more of the UEs initially configured as an RX UE transmits additional radar signals after the initial radar signal is transmitted, and the corresponding RX radar signal samples are processed. For example, the process for selecting and configurating transmitting/receiving UEs described above is repeated to select and configure a new TX UE and RX UEs. However, in at least some embodiments, all iterations of TX and RX UEs is configured prior to a first iteration of coordinated radar processing. A new radar signal is then transmitted, received, and processed in the same manner described above.

FIG. 1 illustrates an example wireless communication system 100 employing a selected set of UEs 102 for performing coordinated radar sensing in accordance with some embodiments. As shown, the wireless communication system 100 is a mobile cellular system and includes multiple UE 102, illustrated as UE 102-1, UE 102-2, UE 102-3, and UE 102-4. Each UE 102 can communicate with one or more base stations 104 through one or more wireless communication links 106. The UE 102, in at least some embodiments, is a multimode UE that employs multiple radio access technologies (RATs), either concurrently or successively, to access one or more services through the base station 104 in support of software applications executing at the UE 102.

In the example shown in FIG. 1, the UE 102 is implemented as a smartphone. Although illustrated as a smartphone, the UE 102 may be implemented as any suitable computing or electronic device, such as a cellular phone, a cellular-enabled modem, a cellular-enabled smartwatch or other wearable device, a cellular-enabled gaming device, a cellular-enabled media device, a cellular-enabled laptop or desktop computer, a cellular-enabled tablet computer, an automobile or other vehicle employing cellular services (e.g., for navigation, provision of entertainment services, in-vehicle mobile hotspots, etc.), a cellular-enabled Internet-of-things (IoT) device (e.g., sensor node, controller/actuator node, or a combination thereof), and the like. As described in greater detail below, the multiple UEs 102, in at least some embodiments, form a UE-coordination set to perform coordinated radar sensing of objects.

In at least some embodiments, the base station 104 is implemented in a macrocell, microcell, small cell, picocell, or the like, or any combination thereof. Examples of the base station 104 include an Evolved Universal Terrestrial Radio Access Network Node B (E-UTRAN Node B), evolved Node B (eNodeB or eNB), Next Generation Evolved Node B (ng-eNB), Next Generation Node B (gNode B or gNB), and the like. As is well known in the art, the base station 104 operates as an "air interface" to establish radio frequency (RF) wireless connections with UEs 102. The base station 104, in at least some embodiments, communicates with the UEs 102 via the wireless communication link 106, which can be implemented as any suitable type of wireless communication link.

The wireless communication links 106, in at least some embodiments, include a downlink of data and control information communicated from the base station 104 to a UE 102, an uplink of other data and control information communicated from a UE 102 to the base station 104, or both. The wireless communication links 106 include, for example, one or more wireless communication links or bearers implemented using any suitable communication protocol or standard, or combination of communication protocols or standards such as 3rd Generation Partnership Project Long-Term Evolution (3GPP LTE), Enhanced Long-Term Evolution (eLTE), Fifth-Generation New Radio (5G NR), Fourth-Generation (4G) standard, and so forth. In at least some embodiments, multiple wireless communication links 106 are aggregated in a carrier aggregation to provide a higher data rate for the UEs 102. Multiple wireless communication links 106 from multiple base stations 104 can be configured for Coordinated Multipoint (CoMP) communication with the UEs 102. Additionally, multiple wireless communication links 106, in at least some embodiments, are configured for single-RAT) or multi-RAT dual connectivity (MR-DC).

The one or more base stations 104 are collectively a Radio Access Network (RAN) 108 (e.g., Evolved Universal Terrestrial Radio Access Network (E-UTRAN), 5G NR RAN or NR RAN, and the like). The base station 104 in a RAN 108 connects to one or more of the core networks (not shown) within the wireless communication system 100, which couples to one or more of the external networks (e.g., the Internet). Examples of a core network include a Fifth-Generation Core (5GC) network, an Evolved Packet Core (EPC) network, and the like. The wireless communication links 106 serve as data and voice paths between the UEs 102 and the core network for providing various services to the UEs 102. Examples of these services include voice services via circuit-switched networks or packet-switched networks, messaging services such as simple messaging service (SMS) or multimedia messaging service (MMS), multimedia content delivery, presence services, and the like.

FIG. 1 further illustrates an example configuration of the wireless communication system 100 for performing coordinated radar sensing of objects. As described in greater detail below with respect to FIGS. 4 to 7, coordinated radar sensing includes a set of selected UEs 102, such as a UE-coordinated set, transmitting and receiving radar signals in a coordinated manner. During a first iteration of coordinated radar sensing, one UE 102-2 of the selected UEs operates in a transmitting mode to transmit radar signals, and one or more different UEs 102-3, 102-4 of the selected UEs operate in a receiving mode to receive the radar signals. In a subsequent iteration of coordinated radar sensing, the operating modes of the UEs 102 can stay the same with a repeated cycle or they can change such that a different UE 102 (e.g., UE 102-3) transmits a radar signal, and one or more different UEs (e.g., UE 102-2 and UE 102-4) receive the radar signal. In this way, a single UE is not required to perform full-duplex radar sensing, where the single UE is concurrently transmitting and receiving radar signals in the same frequency band. One or more of the UEs 102 (e.g., UE 102-1) in the set of selected UEs processes the received radar signal to determine object location information.

For example, FIG. 1 shows that the base station 104 determines an allocation 110 of air interface resources, such as transmission time and frequency resources, for performing coordinated radar sensing. The base station 104 transmits the allocation 110 to a first UE 102-1 from a set of UEs selected to perform coordinated radar sensing. In this example, UE 102-1 to UE 102-4 form the set of selected UEs. However, it should be understood that the selected set of UEs can include any number of UEs greater than one. The first UE 102-1, in at least some embodiments, determines a configuration 112 for coordinated radar sensing. The configuration 112 includes, for example, radar signal transmission parameters, radar signal detection/sensing parameters, a selection of a transmitting (TX) UE, a selection of a receiving (RX) UEs, and the like. The first UE 102-1 determines the configuration 112 based, at least in part, on the air interface resources allocated by the base station 104. In other embodiments, the base station 104 determines the configuration 112 and transmits the configuration 112 to the first UE 102-1.

The first UE 102-1, in at least some embodiments, communicates with each of the remaining UEs 102, such as UEs 102-2 to 102-4, to configure each of these UEs 102 for performing coordinated radar sensing. For example, based on the configuration 112, the first UE 102-1 transmits a TX configuration 114 to the second UE 102-2 (TX UE 102-2). The TX configuration 114 configures the second UE 102-2 as a TX UE for at least a first iteration of coordinated radar sensing. For example, the first UE 102-1 can transmit a message to the second UE 102-2 identifying a waveform to be utilized as the radar signal and further identifying transmission parameters for transmitting the radar signal.

In this example, the first UE 102-1 also transmits an RX configuration 116 (e.g., 116-1 and 116-2) to each of the third UE 102-3 (RX UE 102-3) and fourth UE 102-4 (RX 102-4). The RX configuration 116 configures the third UE 102-3 and fourth UE 102-4 as RX UEs for at least the first iteration of coordinated radar sensing. In one example, the first UE 102-1 sends a message to third UE 102-3 and fourth UE 102-4 identifying a plurality of attributes associated with a radar signal to be detected such as a waveform attribute of the radar signal and timing attributes associated with transmission of the radar signal. In some embodiments, for another iteration of coordinated radar sensing that occurs after the first iteration, the second UE 102-2 repeats the radar signal transmission and the third UE 102-3 and fourth UE 102-4 repeat the radar signal detection. In at least some embodiments, for subsequent iterations of coordinated radar sensing, the first UE 102-1 assigns and configures a different UE 102 as the TX UE and changes at least one UE 102 selection for the RX UEs. For example, the third UE 102-3 can be selected and configured as the TX UE, and the second UE 102-2 and the fourth UE 102-4 can be selected and configured as the RX UEs for a subsequent iteration of coordinated radar sensing. Also, the first UE 102-1 can be selected and configured as a TX UE or an RX UE for a given iteration.

After the UEs 102 have been configured, the UEs 102 perform coordinated radar sensing. For example, the second (TX) UE 102-2 determines that an object detection trigger has occurred based on, for example, the TX configuration 114, an environmental context of the second UE 102-2, data received from at least one sensor of the second UE 102-2, a request received from a user of the second UE 102-2, a request and/or data received from an application executing on the second UE 102-2, a request and/or data received from one or more of the other UEs 102, a request and/or operating parameters of a vehicle associated with the one or more of the UEs 102, a combination thereof, and the like. The second UE 102-2 transmits a radar signal 118 based on the object detection trigger and the TX configuration 114.

In at least some embodiments, the UEs 102 of the selected set of UEs synchronize to a common cellular timing reference. The third UE 102-3 and the fourth UR 102-4 determine when the second UE 102-2 is transmitting a radar signal based on the RX configuration 116 received from the first UE 102-1. Therefore, when the second UE 102-2 transmits the radar signal, the third UE 102-3 and the fourth UE 102-4 operate in a radar signal detecting/sensing mode. The radar signal 118 is received by the third UE 102-3, and the fourth UE 102-4 in one or more reflection states 120. For example, FIG. 1 shows the transmitted radar signal 118-1 in a first reflection state 120-1 where the transmitted radar signal 118-1 is reflected by one or more objects 122 (e.g., vehicles, pedestrians, animals, obstacles, geographical features, and the like), thereby creating one or more reflected radar signals 118-2, 118-3. The reflected radar signals 118-2, 118-3 are received by one or more of the third UE 102-3 and the fourth UE 102-4. FIG. 1 further shows the radar signal 118 received by at least the third UE 102-3 in a second reflection state 120-2. In the second reflection state 120-2, no objects reflect the transmitted radar signal 118. Accordingly, the non-reflected radar signal 118 is referred to as a line-of-sight (LOS) radar signal 118-4.

One or more of the second UE 102-2, third UE 102-3, and fourth UE 102-4 generate radar signal samples 124 (e.g., samples 124-1 to 124-3) and transmit these samples 124 to the first UE 102-1 for processing. For example, the second UE 102-2 generates TX radar signal samples 124-1 for the radar signal 118-1 (including LOS radar signal 118-4) transmitted by the second UE 102-2. The third UE 102-3 and fourth UE 102-4 generate RX radar signal samples 124-2, 124-3 for the received radar signals 118-2 to 118-4. The first UE 102-1 receives and processes the radar signal samples 124 to determine object location information 126. In other embodiments, the third UE 102-3 and/or fourth UE 102-4 process their own RX radar signal samples 124-2, 124-3 to at least partially determine object location information 126 based on the RX radar signal samples and GNSS (or other location information) regarding the UEs 102. The partial objection location information 126 determined by one RX UE 102, in at least some embodiments, is transmitted to the other UEs 102 perhaps along with the GNSS (or other location information of that RX UE 102). The other UEs 102 further refine their local object location information 126 using the received objection location 126. In at least some embodiments, the set of UEs 102 performs additional iterations of coordinated radar sensing to further refine the object location information 126 determined by the first UE 102-1 and/or the other UEs 102.

Figure 2:
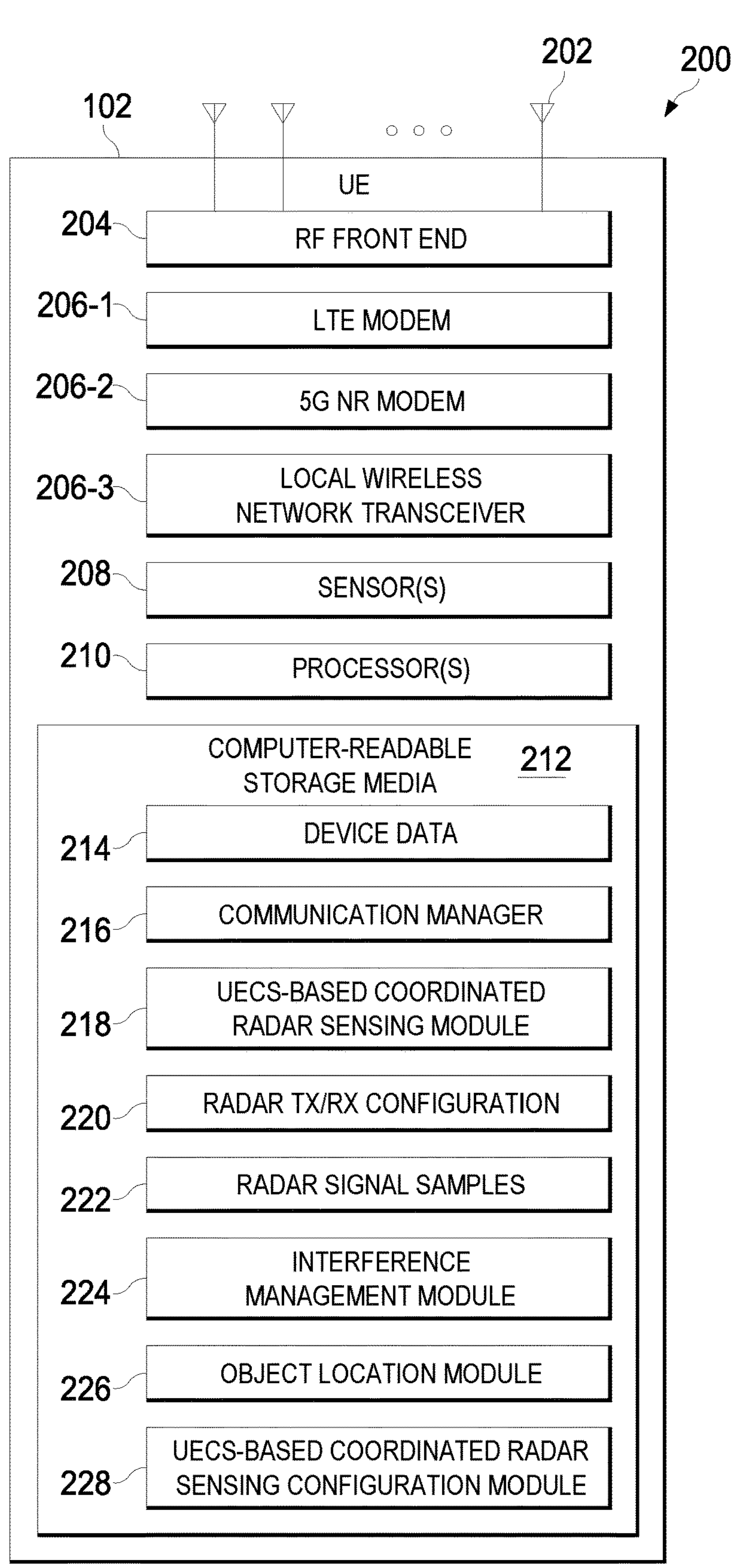
FIG. 2 is a diagram illustrating an example configuration of a UE implementing coordinated radar sensing functionality in accordance with some embodiments.

FIG. 2 illustrates an example device diagram 200 of a UE 102. In aspects, the device diagram 200 describes a UE that can implement various aspects of a coordinated radar sensing fora wireless communication system. The UE 102 may include additional functions and interfaces that are omitted from FIG. 2 for the sake of clarity. The UE 102, in at least some embodiments, includes antennas 202, a radio frequency (RF) front end 204, and one or more RF transceivers 206 (e.g., an LTE transceiver 206-1 and a 5G NR transceiver 206-2) for communicating with a base station 104 in a RAN 108, such as a 5G RAN and/or an E-UTRAN. The UE 102, in at least some embodiments, also includes one or more additional transceivers 206-3, such as a local wireless network transceiver, for communicating over one or more local wireless networks (e.g., WLAN, Bluetooth, Near-Field Communication (NFC), a personal area network (PAN), Wireless Fidelity Direct (WiFi-Direct), IEEE 802.15.4, ZigBee, Thread, mmWave, and the like) with other UEs 102 selected to perform coordinated radar sensing. The RF front end 204, in at least some embodiments, couples or connects the LTE transceiver 206-1, the 5GNR transceiver 206-2, and the local wireless network transceiver 206-3 to the antennas 202 to facilitate various types of wireless communication.

The antennas 202 of the UE 102, in at least some embodiments, include an array of multiple antennas configured similar to or different from each other. The antennas 202 and the RF front end 204, in at least some embodiments, are tuned to, and/or can be tunable to, one or more frequency bands, such as those defined by the 3GPP LTE, 3GPP 5GNR, IEEE WLAN, IEEE WMAN, or other communication standards. In at least some embodiments, the antennas 202, the RF front end 204, the LTE transceiver 206-1, the 5GNR transceiver 206-2, and/or the local wireless network transceiver 206-3 are configured to support beamforming (e.g., analog, digital, or hybrid), or in-phase and quadrature (I/Q) operations (e.g., I/Q modulation or demodulation operations) for the transmission and reception of communications with the base station 104. By way of example, the antennas 202 and the RF front end 204 operate in sub-gigahertz bands, sub-6 GHz bands, and/or above 6 GHz bands defined by the 3GPP LTE, 3GPP 5GNR, or other communication standards.

In at least some embodiments, the antennas 202 include one or more receiving antennas positioned in a one-dimensional shape (e.g., a line) or a two-dimensional shape (e.g., a triangle, a rectangle, or an L-shape) for implementations that include three or more receiving antenna elements. While the one-dimensional shape enables the measurement of one angular dimension (e.g., an azimuth or an elevation), the two-dimensional shape enables two angular dimensions to be measured (e.g., both azimuth and elevation). Using at least a portion of the antennas 202, the UE 102 can form beams that are steered or un-steered, wide or narrow, or shaped (e.g., as a hemisphere, cube, fan, cone, or cylinder). The one or more transmitting antennas may have an un-steered omnidirectional radiation pattern or may be able to produce a wide steerable beam. Either of these techniques enables the UE 102 to transmit a radar signal to illuminate a large volume of space. In some embodiments, the receiving antennas generate thousands of narrow steered beams (e.g., 2000 beams, 4000 beams, or 6000 beams) with digital beamforming to achieve desired levels of angular accuracy and angular resolution. In this way, the UE 102 can efficiently monitor an external environment.

The UE 102, in at least some embodiments, includes one or more sensors 208 implemented to detect various properties such as temperature, supplied power, power usage, battery state, or the like. The sensors 208 can include any one or a combination of temperature sensors, thermistors, battery sensors, and power usage sensors.

The UE 102 also includes at least one processor 210 and computer-readable storage media 212 (CRM 212). The processor 210, in at least some embodiments, is a single-core processor or a multiple-core processor composed of a variety of materials, such as silicon, polysilicon, high-K dielectric, copper, and so on. The computer-readable storage media described herein excludes propagating signals. The CRM 212, in at least some embodiments, includes any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 102. The device data 214 includes, for example, user data, multimedia data, beamforming codebooks, applications, and/or an operating system of the UE 102, which are executable by the processor 210 to enable user-plane communication, control-plane signaling, and user interaction with the UE 102.

The CRM 212, in at least some embodiments, also includes a communication manager 216. Alternatively, or additionally, the communication manager 216, in at least some embodiments, is implemented in whole or part as hardware logic or circuitry integrated with or separate from other components of the UE 102. In at least some embodiments, the communication manager 216 configures the RF front end 204, the LTE transceiver 206-1, the 5G NR transceiver 206-2, and/or the local wireless network transceiver 206-3 to perform one or more wireless communication operations.

In at least some embodiments, the CRM 212 further includes a coordinated radar sensing module 218, one or more radar RX/TX configurations 220, radar signal samples 222, an interference management module 224, an object location module 226, and a coordinated radar sensing configuration module 228. Alternately, or additionally, one or more of these components, in at least some embodiments, are implemented in whole or part as hardware logic or circuitry integrated with or separate from other components of the UE 102. The coordinated radar sensing module 218, in at least some embodiments, configures the RF front end 204, the LTE transceiver 206-1, the 5G NR transceiver 206-2, the local wireless network transceiver 206-3, and/or processor 210 to implement the techniques described herein for coordinated radar sensing. The one or more radar MK/TX configurations 220, for example, configure the UE 102 to transmit a radar signal and/or receive a radar signal for coordinated radar sensing. The radar signal samples 222 include, for example, raw in-phase/quadrature (I/Q) samples of a radar signal transmitted by the UE 102 and/or received by the UE 102. In at least some embodiment, the interference management module 224 is configured (or configures other components of the UE) to remove or reduce interference from received radar signals. The object location module 226, in at least some embodiments, is configured (or configures other components of the UE 102) to determine object location information 126 of an object 122 detected by the coordinated radar sensing techniques described herein. The coordinated radar sensing configuration module 228, in at least some embodiments, implements and/or configures one or more other components of the UE 102 to implement the techniques described herein for configuring coordinated radar sensing by UEs 102 of the wireless communication system 100.

Figure 3:
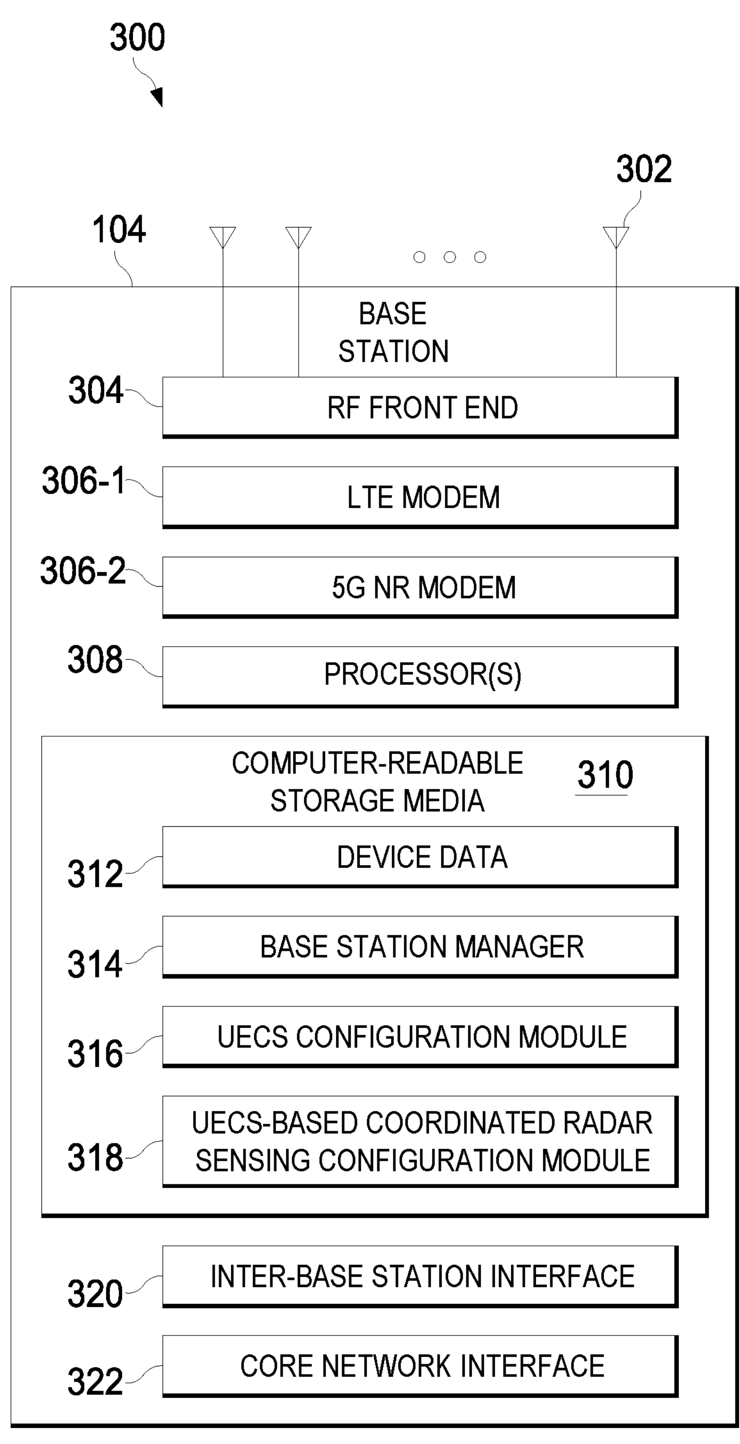
FIG. 3 is a diagram illustrating an example configuration of a base station implementing coordinated radar sensing functionality in accordance with some embodiments.

FIG. 3 illustrates an example device diagram 300 of a base station 104. In aspects, the device diagram 300 describes a base station 104 that can implement various aspects of a coordinated radar sensing for a wireless communication system. The base station 104 may include additional functions and interfaces that are omitted from FIG. 3 for the sake of clarity. The device diagram for the base station 104, shown in FIG. 3, includes a single network node (e.g., a gNode B). However, in at least some embodiments, the functionality of the base station 104 is distributed across multiple network nodes or devices and can be distributed in any fashion suitable to perform the functions described herein. The base station 104, in at least some embodiments, includes antennas 302, a radio frequency front end 304 (RF front end 304), and one or more transceivers 306, such as an LTE transceiver 306-1 and/or one a 5G NR transceiver 306-2, for communicating with the UE 102. The RF front end 304 of the base station 104, in at least one embodiment, couples or connects the transceivers 306 to the antennas 302 to facilitate various wireless communication types.

The antennas 302 of the base stations 104, in at least some embodiments, include an array of multiple antennas configured similar to or different from each other. The antennas 302 and the RF front end 304, in at least embodiments, are tuned to, and/or can be tunable to, one or more frequency bands, such as those defined by the 3GPP LTE 3GPP 5GNR, and other communication standards, and implemented by the transceivers 306. Additionally, the antennas 302, the RF front end 304, and/or the LTE transceivers 306, in at least some embodiments, are configured to support beamforming, such as Massive-multiple-input, multiple-output (Massive-MIMO), for the transmission and reception of communications with any UE 102.

The base station 104 also includes at least one processor 308 and computer-readable storage media 310 (CRM 310). The processor 308, in at least some embodiments, is a single-core processor or a multiple-core processor composed of a variety of materials, such as silicon, polysilicon, high-K dielectric, copper, and so on. The CRM 310, in at least some embodiments, includes any suitable memory or storage device such as random-access memory (RAM), static RAM (SRAM), dynamic RAM (DRAM), non-volatile RAM (NVRAM), read-only memory (ROM), or Flash memory useable to store device data 312 of the base station 104. The device data 312, in at least some embodiments, includes network scheduling data, radio resource management data, beamforming codebooks, applications, and/or an operating system of the base station 104, which are executable by the processor 308 to enable communication with the UE 102.

The CRM 310, in at least some embodiments, also includes a base station manager 314, a UE-coordination set configuration manager 316, and a coordinated radar sensing configuration module 318. Alternately or additionally, one or more of these components, in at least some embodiments, are implemented in whole or part as hardware logic or circuitry integrated with or separate from other components of the base station 104. In at least some embodiments, the base station manager 314 configures the transceivers 306 for communication with the UE 102 and communication with a core network. The UE-coordination set configuration module 316, in at least some embodiments, implements and/or configures one or more other components of the base station 104 to implement the techniques described herein for forming a UE-coordination set. The coordinated radar sensing configuration module 318, in at least some embodiments, implements and/or configures one or more other components of the base station 104 to implement the techniques described herein for configuring coordinated radar sensing by UEs 102 of the wireless communication system 100.

In at least some embodiments, the base station 104 also includes an inter-base station interface 320, such as an Xn and/or X2 interface, which the base station manager 314 configures to exchange user-plane and control-plane data between another base station, to manage the communication of the base station 104 with the UE 102. The base station 104, in at least one embodiment, includes a core network interface 322 that the base station manager 314 configures to exchange user-plane and control-plane data with core network functions and entities.

Figure 4:
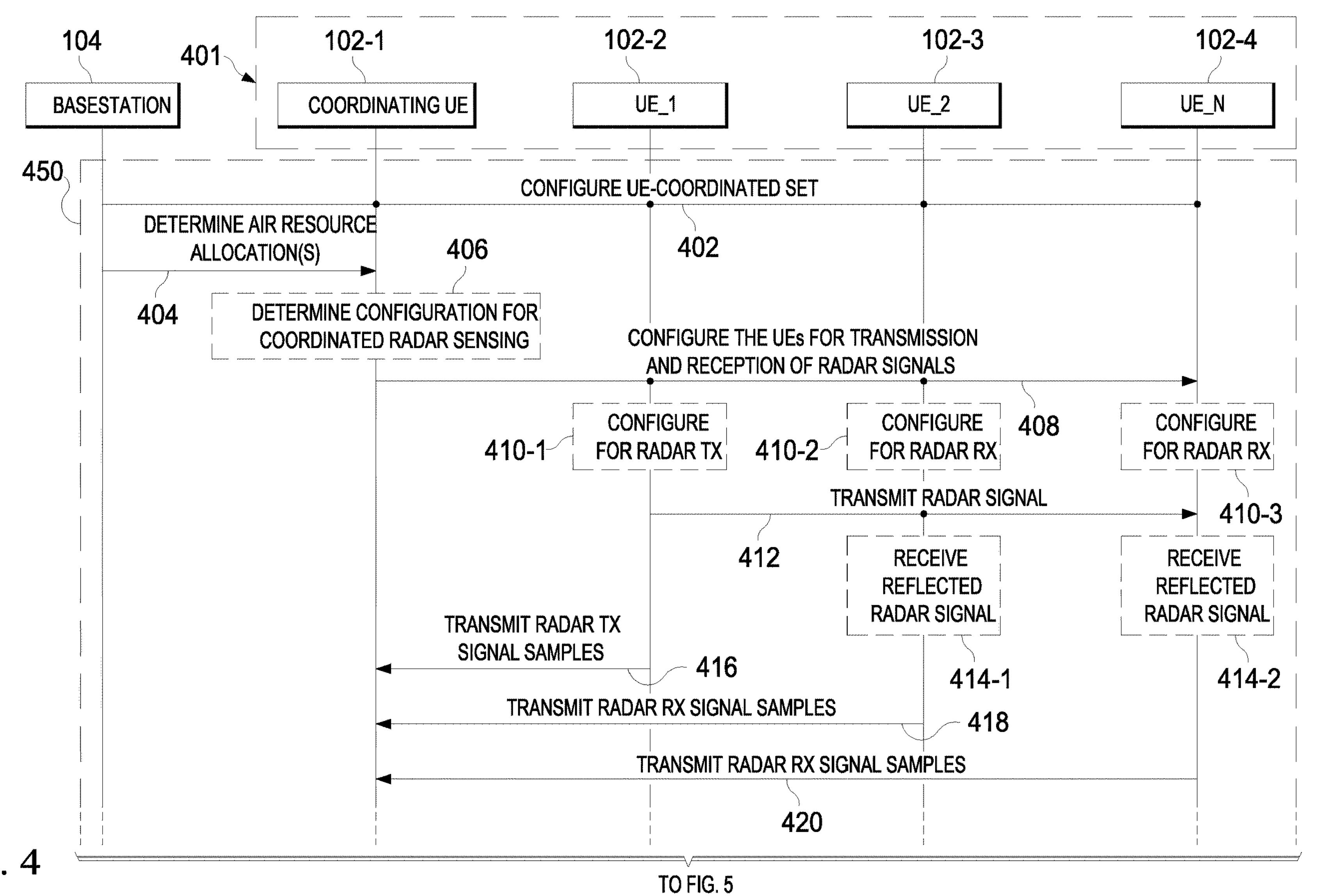
FIGS. 4 and 5 are a diagram illustrating an example operation of coordinated radar sensing by the selected set of UEs of FIG. 1 in accordance with some embodiments.
Figure 5:
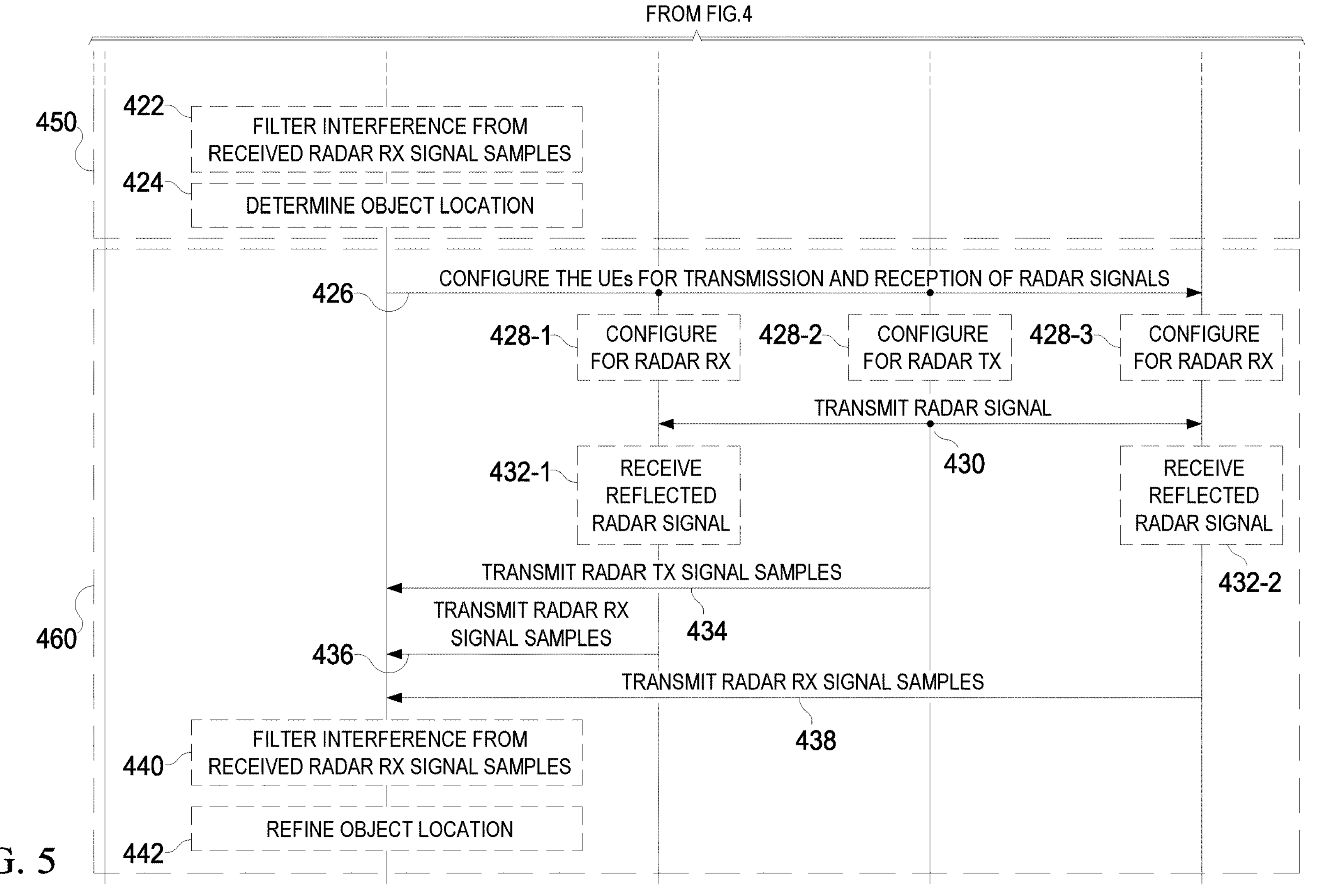

FIG. 4 and FIG. 5 illustrate an example ladder diagram depicting data and control transactions between devices engaged in coordinated radar sensing for object detection in accordance with at least some embodiments. The base station 104, in at least some embodiments, selects 402 a group of UEs 102 to perform coordinated radar sensing for object detection. In other embodiments, a UE 102 selects the group of UEs 102 to perform the coordinated radar sensing. In at least some embodiments, the group of UEs 102 is configured as UE-coordination set 401. The base station 104 and the group of UEs 102 can use any of a variety of techniques to form a UE-coordination set 401, such as the techniques described in PCT Application No. PCT/US2019/068265 entitled "USER-EQUIPMENT-COORDINATION SET FOR A WIRELESS NETWORK", filed on Dec. 23, 2019, which is hereby incorporated by reference in its entirety.

In one example, the formation of a UE-coordination set 401 is based on (or triggered by), a determination to have UEs 102 perform coordinated radar sensing. For example, the base station 104 (or a UE 102) can make an internal decision to have a set of UEs 102 perform coordinated radar sensing, receive a request or indication from a UE 102 to perform coordinated radar sensing, receive a request from another network component to perform coordinated radar sensing, and the like. In other embodiments, a UE-coordination set 401 is formed independently of deciding that UEs

102 are to perform coordinated radar sensing. In an embodiment where a UE 102 sends a request to the base station 104 for coordinated radar sensing, the UE 102 can be triggered to send the request based on, for example, receiving a request from a user and/or application executing at the UE 102, receiving a request from another UE 102 to perform coordinated radar sensing, receiving a request from a vehicle to perform coordinated radar sensing, historical requests made by the UE 102 for performing coordinated radar sensing, time, a current and/or expected location of the UE 102, an environmental and/or operating context of the UE 102, and the like. In some embodiments, the UE 102 requesting coordinated radar sensing is a UE that is unable to perform coordinated radar sensing itself.

UE Coordination Set (UECS) Formation

The base station 104 (or UE 102), in at least some embodiments, forms a UE-coordination set 401 by selecting two or more UEs 102 to be part of the UE-coordination set 401. The UEs 102 are selected based on various attributes of the UEs 102, such as a location of each UE 102 relative to the base station 104, a distance between the UEs 102, and the like. The base station 104 identifies the location of the UEs 102 based on, for example, various factors, such as angle of arrival of signals from the UE 102, timing advance, observed time difference of arrival (OTDOA), and so on. In some embodiments, UEs 102 within a certain distance of each other can more easily coordinate with one another to reduce signal interference when in close proximity by using a local wireless network. UE coordination can also be based on spatial beams or timing advance, or both, associated with each UE 102. For example, for beamforming or Massive-MIMO, it may be desirable that all the UEs 102 within the UE-coordination set 401 can receive the same signal from the base station 104 or another UE 102. Therefore, all the UEs 102 within the UE-coordination set 401 may be geographically near one another, e.g., within a threshold distance of a particular UE 102 in the UE-coordination set 401. In this way, the UEs 102 in the UE-coordination set 401 may each be in the same beam or beams close to each other (e.g., adjacent or overlapping beams). Also, UEs 102 in the UE-coordination set 401 may have the same timing advance or timing advances that are within a predetermined threshold of each other.

The base station 104, in at least some embodiments, sends layer-2 messages (e.g., Media Access Control layer) and/or layer-3 (e.g., Service Data Adaptation Protocol layer) messages to UEs 102 to direct or request those UEs 102 to join the UE-coordination set 401. The base station 104 provides, for example, additional data to the UEs 102 within the UE-coordination set 401 to enable the UEs 102 to communicate with a coordinating UE and/or others UEs 102 in the UE-coordination set 401. The additional data includes, for example, an identity of the coordinating UE and/or an identity of the other UEs, security information, and/or local wireless network information. In at least some embodiments, the base station 104 receives a response message from a UE 102 in the UE-coordination set 401 acknowledging the request message. In some cases, the base station 104 receives a response message (not shown) from at least two of the UEs 102, acknowledging that a UE 102 has joined the UE-coordination set 401. The response message indicates, for example, that a user has approved the request message of the UE 102.

Coordinating UE Selection

In addition, the base station 104, in at least some embodiments, identifies and commands (or requests) a specific UE 102 within the UE-coordination set 401 to act as a coordinating UE for the UE-coordination set 401. The remaining UEs 102 of the UE-coordination set 401 are assisting UEs. The base station 104, in one example, transmits a configuration message (e.g., a request message) to a specific UE 102 requesting that the specific UE 102 act as the coordinating UE for the UE-coordination set 401. The specific UE 102 may accept or decline the request based on user input from a user of the UE 102 or a setting to automatically accept or decline such requests. In at least some embodiments, the UE 102 transmits a UE-capability message or other layer-3 message as a response to the request message from the base station 104. As described in greater detail below, the coordinating UE, in at least some embodiments, coordinates the transmission, reception, and processing of radar signals by the UEs 102 in the UE-coordination set 401. In at least some embodiments, the coordinating UE also determines where the processing of the radar signals is to occur for object detection, e.g., at the coordinating UE or the assisting UEs.

In at least some embodiments, the base station 104 selects the coordinating UE from the group of UEs 102 in the UE-coordination set 401 based on a variety of factors, some of which may be signaled to the base station by the UE 102 using a UE-capability message. One example factor includes the processing power of the coordinating UE, which provides the coordinating UE the capability to handle certain aspects of the UE-coordination set 401, including central coordination or scheduling and radar signal processing. Another factor may include a battery-level state of the coordinating UE. For instance, if a particular UE 102 in the UE-coordination set 401 has a low battery, then the UE 102 may not be a satisfactory candidate to act as the coordinating UE. Accordingly, UEs 102 within the UE-coordination set 401 with a battery-level state above a threshold value may be considered candidates for selection as the coordinating UE. Other factors for selecting the coordinating UE include the processing power of each UE 102, a charging state of each UE 102, a capability of each UE 102, a combination thereof, and the like. In one example, the base station 104 first selects one UE 102 as a coordinating UE. Then, after the formation of the UE-coordination set 401, the base station 104 receives messages from the other UEs 102 in the UE-coordination set 401 indicating respective battery-level states. Then, in this example, the base station 104 changes the coordination UE if another UE 102 in the UE-coordination set 401 is a better candidate based on the battery-level or charging states of the UEs 102 in the UE-coordination set 401.

A location of the coordinating UE can also be another factor for selecting a coordinating UE. For example, the base station 104 identifies the location of the UEs 102 in the UE-coordination set 401 as previously described with respect to the formation of a UE-coordination set. In some embodiments, the base station 104 selects a coordinating UE with a geographically central location in the UE-coordination set 401, as this may maximize the coordinating UE's capability to coordinate and communicate with the other UEs in the UE-coordination set 401. However, the coordinating UE 102 is not required to be in a central location of the UEs 102 in the UE-coordination set 401. Instead, the coordinating UE can be located at any location within the UE-coordination set 401 that allows the coordinating UE 102 to communicate and coordinate with the other UEs 102 in the UE-coordination set 401. In at least some embodiments, the base station 104 continually monitors the UE-coordination set 401 and updates the coordinating UE 102 at any time based on updated factors, such as updated UE locations, UE battery-level state, and so on. The coordinating UE 102 can also transfer its joint processing responsibilities to another UE 102 based on factors such as processing power, battery level, and/or geographic location.

In at least some embodiments, the base station 104 receives indications from one or more UEs 102 in the UE-coordination set 401 that advertise their capability to act as the coordinating UE. Alternatively, or additionally, the base station 104 can receive indications from one or more UEs 102 in the UE-coordination set 401 that indicate a willingness of a user of a respective UE 102 to allow their UE 102 to participate in the UE-coordination set 401 and/or act as the coordinating UE. Accordingly, a UE 102 in the UE-coordination set 401 can indicate, using a layer-3 message, to the base station 104 whether the UE 102 can serve and/or permitted to serve as the coordinating UE.

In the example illustrated in FIG. 4, the base station 104 selects a first UE 102-1 selected as the coordinating UE (coordinating UE 102-1) and a second UE 102-2, third UE 102-3, and fourth UE 102-4 as assisting UEs (assisting UEs 102-2 to 102-4). It should be understood that embodiments are not limited to this configuration of a UE-coordination set 401, and any number of UEs 102 greater than one can form the UE-coordination set 401.

In addition to forming the UE-coordination set 401, the base station 104 determines and provides 404 an allocation 110 of air interface resources, such as transmission time and frequency resources, for the UE-coordination set 401 to perform coordinated radar sensing. For example, the base station 104 allocates transmission frames/slot, frequency bands, frequencies, one or more waveforms, transmission power level, and the like for use by the UE-coordination set 401 when performing coordinated radar sensing. In at least some embodiments, formation of the UE-coordination set 401 triggers allocation of the air interface resources. However, in other embodiments, the base station 104 allocates resources in response to determining that the UE-coordination set should perform coordinated radar sensing. For example, the base station 104 allocations air interface resource based on making an internal decision, receiving a request from a UE 102 that is part of the UE-coordination set 401, receiving a request from a UE 102 that is not part of the UE-coordination set 401 or receiving a request from another network component to perform coordinated radar sensing for object detection.

The base station 104, in at least some embodiments, transmits the allocation 110 of air interface resources to the coordinating UE 102-1 via signaling and/or configuration mechanisms. The coordinating UE 102-1 receives the allocation 110 from the base station 104 and determines 406 a configuration 112 for the UE-coordination set 401 to perform coordinated radar sensing. In at least some embodiments, the configuration 112 includes information such as identifiers of UEs 102 in the UE-coordination set 401, location information, cellular timing reference information, radar TX/RX information, radar waveform information, beamforming configuration, a number of coordinated radar sensing iterations, a TX UE selection and RX UE selection for each iteration, and the like. If the UE-coordination set 401 is to perform multiple iterations of coordinated radar sensing, the coordinating UE 102-1, in at least some embodiments, determines a configuration 112 for all iterations before the UE-coordination set 401 performs the first iteration. In other embodiments, the coordinating UE 102-1 determines a configuration 112 only for the current iteration. Also, the base station 104, in some embodiments, can determine at least a portion of the configuration 112 and provides 404 it when providing air interface resource allocation(s).

In at least some embodiments, the cellular timing reference information of the configuration 112 synchronizes the UEs 102 of the UE-coordination set 401 based on a common cellular timing reference point so that the RX UEs are operating to detect/sense radar signals at the time when the TX UE transmits a radar signal. In one example, the UEs 102 of the UE-coordination set 401 are synchronized to system frame/slot/symbol timing from the base station 104 because each UE 102 is already synchronized with the base station 104. In another example, the UEs 102 of the UE-coordination set 401 synchronizes to Global Navigation Satellite System (GNSS) timing. However, it should be understood that other synchronization mechanisms are applicable as well.

Radar TX/RX information, in at least some embodiments, includes timing and frequency resources determined by the coordinating UE 102-1 based on the allocation of resources received from the base station 104. For example, the base station 104 allocates a number of frames (or specific frames) to be used for transmitting and detecting radar signals and further allocates a set of frequencies to be used for transmitting radar signals. In this manner, the base station 104 will be aware of the radar signals transmitted by the UECS and, separately, the base station 104 can mitigate or avoid UECS radar signal interference to its other signals. The coordinating UE 102-1, in some embodiments, determines which of the frames and frequencies allocated by the base station 104 are to be used by a TX UE for transmitting/receiving the radar signals. The coordinating UE 102-1 selects all or a subset of the allocated frames and frequencies.

Radar waveform information, in at least some embodiments, identifies the waveform to be used for the transmitted radar signal 118. Any waveform having satisfactory self-correlation properties may be used for the radar signal 118. In at least some embodiments, a separate radar signal is not required to be transmitted. For example, the coordinating UE 102-1 can select a signal already configured to be transmitted by a TX UE, such as a Sounding Reference Signal (SRS) or a Random Access Channel (RACH) signal. If the coordinating UE 102-1 determines a waveform for multiple iterations of a coordinated radar sensing instance, the waveform information can include an iteration identifier. The iteration identifier indicates the specific iteration of coordinated radar sensing for which a determined waveform is to be used by a TX UE for the radar signal waveform. The waveform information can also include a unique identifier for the TX UE to indicate which UE 102 of the UE-coordination set 401 is to implement the waveform for the given iteration. If the UE-coordination set 401 is to perform multiple iterations of coordinated radar sensing, the coordinating UE 102-1 selects the same waveform for all iterations or selects a different waveform for at least two of the iterations. Therefore, two or more different TX UEs can transmit the same or different waveforms for a different iterations of a given instance of coordinated radar sensing. In one example, the coordinating UE 102-2 determines different waveforms by using a different cyclic shift for a random sequence. If the base station 104 desires to combine SRS and coordinated radar sensing functions, the base station 104 provides the relevant portions of the configuration 112 to the coordinating UE 102-1.

The beamforming configuration, in at least one embodiment, includes information that is utilized by one or more of the TX UEs and RX UEs in the UE-coordination set 401 to perform beamforming and angle of arrival detection of radar signals. For example, the coordinating UE 102-1 receives beamforming capability information for each assisting UE 102-2 to 102-4. Beamforming capability information includes, for example, a number of beam identities, a number of antenna modules, a number of wide beams and narrow beams for each antenna, and the like for one or more of the assisting UEs 102-2 to 103-4. The coordinating UE 102-1 uses the beamforming capability information to determine a beamforming configuration for an assisting UE 102-2 to 102-4 that includes, for example, a beam sweeping pattern to be utilized by a TX UE of the assisting UEs 102-2 to 102-4. In at least one embodiment, the beam sweeping pattern parameters steer the beams away from RX UEs of the assisting UE 102-2 to 102-4 to mitigate direct path interference. A beam configuration, in at least some embodiments, indicates the direction in which an RX UE of the assisting UEs 102-3 to 102-4 should tune/steer its receiver to mitigate direct path interference from the TX UE 102-2.

The number of coordinated radar sensing iterations indicates to the UEs 102 of the UE-coordination set 401 the number of iterations to be performed for a given instance of coordinated radar sensing. For example, a given instance of coordinated radar sensing can have a single iteration 450 or multiple iterations 450, 460 of radar signal transmission and detection. In at least some embodiments, one iteration of coordinated radar sensing includes a single transmission of a radar signal 118 by one or more TX UEs of the UE-coordination set 401. In at least some embodiments, two or more iterations of a given coordinated radar sensing instance (cycle) have different UEs 102 selected as the TX UE. The coordinating UE 102-1 can select the same waveform for all iterations or select a different waveform for two or more iterations of a coordinated radar sensing instance.

The TX UE selection includes information such as an iteration identifier, a unique identifier of the UE 102 selected as the TX UE for that iteration, and the like. The RX UE selection includes information such as an iteration identifier, a unique identifier of the UE 102 selected as the RX UE for that iteration, and the like.

After the coordinating UE 102-1 determines the configuration 112 for at least one iteration 450 of coordinated radar sensing, the coordinating UE 102-1 sends 408 at least a portion of the configuration 112 to each of the assisting UEs 102-2 to 102-4 based on the configuration 112. In one example, if multiple iterations of coordinated radar sensing are to be performed, the first configuration 112 can include configuration information for both the current iteration 450 and future iterations 460. In another example, each iteration 450, 460 can have its own separately-signaled configuration. Also, configurations 112 for subsequent iterations can be 460 based on object location information 426 determined during a previous iteration.

The coordinating UE 102-1 transmits, for example, a TX configuration 114 to the UE 102-2 selected as the TX UE for the current iteration 450 of coordinated radar sensing. The coordinating UE 102-1 also transmits an RX configuration 116 to the UEs 102-3, 102-4 selected as an RX UE for the current iteration 450 of coordinated radar sensing. In other embodiments, the base station 104 transmits one or more of the TX configuration 114 or the RX configuration 116 to the assisting UEs 102 to 104. If the coordinating UE 102-1 configures the assisting UEs 102-2 to 102-4 for multiple iterations 450, 460 of coordinated radar, the coordinating UE 102-1 can transmit both a TX configuration 114 and an RX configuration 116 to one or more assisting UEs 102-2 to 102-4. In at least some embodiments, the coordinating UE 102-1 combines TX and RX configurations 114, 116 for multiple iterations 450, 460 into a single configuration or transmits TX and RX configurations 114, 116 for multiple iterations as part of a single configuration transmission. The coordinating UE 102-1 can also send new or updated TX and RX configurations 114, 116 to the assisting UEs 102-2 to 102-4 that override or re-order their previous TX and RX configurations 114, 116

The coordinating UE 102-1, in at least some embodiments, uses cellular and/or non-cellular technologies to communicate with the assisting UEs 102-2 to 102-4. For example, the coordinating UE 102-1 directly communicates with the assisting UEs 102-2 to 102-4 via one or more local wireless network connections (e.g., personal area network, near-field communication (NFC), Bluetooth™ ZigBee™, and the like). In other embodiments, the coordinating UE 102-1 uses sidelink channels (e.g., PC5 interface) to directly communicate with the UEs 102-2 to 102-4.

The TX configuration 114, in at least some embodiments, configures the second UE 102-2 as a TX UE for at least a first iteration 450 of coordinated radar sensing. For example, the TX configuration 114 includes information or parameters from the configuration 112 such as the location of other UEs 102 in the UE-coordination set 401, the timing reference information, scheduling information such as frame/slot/symbol timing for transmitting a radar signal, transmission frequencies such as a specific frequency within sub-gigahertz bands, sub-GHz bands, millimeter mmWave bands, terahertz bands, etc., a beamforming configuration; an iteration identifier indicating which iteration of multiple iterations the UE 102-2 is a TX UE, and the like.

The RX configuration 116, in at least some embodiments, configures one or more of the remaining assisting UEs 102-3, 102-4 as an RX UE for at least a first iteration 450 of coordinated radar sensing. For example, the RX configuration 116 includes information or parameters from the configuration 112 such as the location of other UEs 102 in the UE-coordination set 401, the timing reference information, radar transmission scheduling information such as frame/slot/symbol timing for receiving a radar signal, frequencies at which a radar signal is to be transmitted such as a specific frequency within sub-gigahertz bands, sub-GHz bands, millimeter mmWave bands, terahertz bands, etc., a beamforming configuration, an iteration identifier indicating which iteration of multiple iterations the UE 102-3, 102-4 is an RX UE, and the like.

The assisting UEs 102-2 to 102-4 receive and implement 410 (illustrated as 410-1 to 410-3) their respective TX configuration 114 and RX configuration 116. For example, the second UE 102-2 configures for radar transmission based on implementing the TX configuration 114. The third UE 102-3 and fourth UE 102-4 configure for radar detection/sensing based on implementing the RX configuration 116.

The second UE-102-2 determines that an object detection trigger has occurred and, in response, transmits 412 a radar signal 118-1 based on the TX configuration 116. Object detection triggers can be any type of trigger event suitable for causing the second UE-102-2 to transmit the radar signal 118-1. Examples of triggers include receiving a request from a user and/or application executing at the second UE 102-2 to perform object detection, receiving a request from another UE 102 to perform object detection, time, a current and/or expected location of the second UE 102-2, an environmental and/or operating context of the second UE 102-2, and the like. In at least some embodiments, the TX configuration 116 includes one or more triggers events based on time, location, velocity, a combination thereof, and the like that are to be monitored for by the second UE-102-2. For example, the TX configuration 116 can specify a specific time (e.g., 1:00:00 p.m.), elapsed time, or periodicity (e.g., every 30 seconds) that the UE-102-2 is to transmit a radar signal 118-1. Location triggers can identify geographical coordinates, geographical areas (e.g., neighborhood, city, etc.), road type (highway, local street, etc.), and the like. Velocity triggers can identify a speed threshold (e.g., over 30 kilometers per hour (kph)), a speed range (e.g., between 30 kph and 130 kph), and the like at which the UE-102-2 is to transmit a radar signal 118-1. Also, the second UE 102-2 can monitor for a combination of two or more object detection triggers. For example, the TX configuration 116 can define a trigger that causes the second UE 102-2 to transmit a radar signal 118-1 every 5 minutes when traveling between 0 and 1 kph, every 60 seconds when traveling between 2 to 15 kph, every 1 second when traveling between 15 to 100 kph, every 10 microseconds when traveling over 100 kph, and the like.

The second UE 102-2, in at least some embodiments, uses the radar signal 118-1 waveform indicated in the TX configuration 114. Any waveform having satisfactory self-correlation properties may be used for the radar signal 118-1. In at least some embodiments, a separate radar signal is not required to be transmitted. For example, the coordinating UE 102-1 can select a signal already scheduled/configured to be transmitted by the second UE 102-2, such as such as an SRS or a RACH signal. Therefore, when the second UE 102-2 transmits an SRS or RACH signal to the base station 104, the second UE 102-3 and fourth UE 102-4 monitor for any reflections of these signals by objects 122.

In at least some embodiments, the second UE 102-2 transmits the radar signal 118-1 using the transmission and encoding techniques of the wireless communication system 100. One example of a data transmission technique is Orthogonal Frequency Division Multiplex (OFDM). As is known, OFDM utilizes closely spaced carriers (e.g., 15 kilohertz (kHz) in 4G LTE and 30 kHz in 5G NR) that are modulated with low-rate data, where data to be transmitted is split across all the carriers. The signals are made orthogonal to each other to avoid interference by having the carrier spacing equal to the reciprocal of the symbol period. The data transmitted using OFDM can be modulated utilizing techniques such as Frequency Division Duplex (FDD) or Time Division Duplex (TDD). The time-domain signal can be obtained by taking the inverse Fourier transform, where a cyclic prefix is appended to the start of a symbol. A concatenation of symbols forms a frame, where the signal standard sets the number of symbols per frame. The allocated bandwidth is divided into individual subcarriers for the frequency domain, where the subcarriers are separated in the frequency domain per the signal standard.

The third UE 102-3 and the fourth UE 102-4 operate 414 (illustrated as 414-1 and 414-2) in a radar signal receiving mode and receive the transmitted radar signal 118. In at least some embodiments, the third UE 102-3 and the fourth UE 102-4 use information in the RX configuration 116, such as the radar transmission scheduling information, to determine when to operate in a radar signal receiving mode. For example, if coordinating UE 102-1 configures the second UE 102-2 to transmit a radar signal at frame m or time n, the third UE 102-3 and the fourth UE 102-4 operate to detect the radar signal at frame m or time n. The radar signal 118, in at least some embodiments, is received by the third UE 102-3 and the fourth UE 102-4 in one or more reflection states 120, such as a reflected state 120-1 and a non-reflected state 120-2. For example, when the radar signal 118-1 encounters an object 122, the object reflects the radar signal 118-1 creating one or more reflected radar signals 118-2, 118-3. The third UE 102-3 and the fourth UE 102-4 receive the reflected radar signals 118-2, 118-3, which are in the first reflection state 120-1. In addition to receiving a reflected radar signal 118-2, 118-3, one or more of the third UE 102-3 and the fourth UE 102-4 can also receive a line-of-sight (LOS) radar signal 118-4 directly from the second UE 102-2. The LOS radar signal 118-4 does not include any reflections and is, therefore, received in the second reflection state 120-2.

In some embodiments, the LOS radar signal 118-4 may be considered interference. Therefore, the assisting UEs 102-2 to 102-4, in at least some embodiments, use beamforming and angle-of-arrival detection to transmit and detect the radar signal for mitigating interference caused by the TX UE. For example, the second UE 102-2 utilizes the UE location information and beamforming configuration in the TX configuration 114 to generate one or more beams, and the steer beams away from the third UE 102-3 and fourth UE 102-4. The third UE 102-3 and fourth UE 102-4 can use the beamforming configuration in the RX configuration 116 to tune their receivers away from the location of the second UE 102-2. Steering the beams away from the third UE 102-3 and fourth UE 102-4 and tuning receivers away from the second UE 102-2 reduces the probability that the third UE 102-3 and fourth UE 102-4 receive an interfering LOS radar signal 118-4 from the second UE 102-2.

The third UE 102-3 and the fourth UE 102-4, in at least some embodiments, correlate the received radar signal 118 with the waveform expected to be transmitted by the second UE 102-2. As previously described, the RX configuration 116 received by the third UE 102-3 and the fourth UE 102-4 can indicate the waveform scheduled for radar transmission by the second UE 102-2. If the received radar signal 118 matches the expected waveform, the third UE 102-3 and the fourth UE determine the received radar signal 118 is of interest. However, if the received radar signal 118 does not match the expected waveform, the third UE 102-3 and the fourth UE determine the received radar signal 118 is of no interest and discard the received radar signal 118.

One or more of the third UE 102-3 and fourth UE 102-4 generate radar signal samples 124 and transmit these samples 124 to the first UE 102-1 for processing. For example, the second UE 102-2 generates and transmits 416 TX radar signal samples 124-1 for the radar signal 118-1 transmitted by the second UE 102-2. The third UE 102-3 generates and transmits 418 RX radar signal samples 124-2 for the radar signals 118-2, 118-4 received by the third UE 102-3. Similarly, the fourth UE 102-4 generates and transmits 420 RX radar signal samples 124-2 for the radar signals 118-3, 118-4 received by the fourth UE 102-4. In some embodiments, the RX radar signal samples 124-2, 124-3 are generated based on both reflected radar signals 118-2, 118-3 and LOS radar signals 118-4 (if received). The samples 124, in at least one embodiment, are transmitted using a local wireless network connection, a sidelink channel, or the like.

In at least some embodiments, the second UE 102-2 generates TX radar signal samples 124-1 by demodulating the transmitted radar signal to baseband I/Q analog signals and sampling the baseband I/Q analog signals to produce I/Q samples. Similarly, the third UE 102-3 and fourth UE 102-4, in at least some embodiments, generate RX radar signal samples 124-2, 124-3 by demodulating the received radar signals 118 to baseband I/Q analog signals and sampling the baseband I/Q analog signals to produce I/Q samples. In addition to transmitting the radar signal samples 124, the assisting UEs 102-2 to 102-4, in at least some embodiments, also transmit timing information such as a system frame number (SFN)) of the transmitted and/or received radar signal 118, a transmission time of the radar signal 118, a reception time of the radar signal 118, and the like.

The coordinating UE 102-1 receives the TX radar signal samples 124-1 and RX radar signal samples 124-2, 124-3 from the assisting UEs 102-2 to 104, and performs operations to cancel (remove or reduce) 433 interference from the radar signal samples 124. In at least some embodiments, interference cancelation includes suppressing direct path interference in the RX radar signal samples 124-2, 124-3 cause by a received LOS radar signal 118-4. For example, the coordinating UE 102-1 can utilize the positions of the assisting UEs 102-2 to 102-4 and the known waveform of the transmitted radar signal 118-1 to subtract the direct path contribution from the RX radar signal samples 124-2, 124-3. In some embodiments, the coordinating UE 102-1 receives location information for the assisting UEs 102-2 to 102-4 from the base station 104 as part of (or in addition to) the UE-coordination set configuration. The coordinating UE 102-1 can also determine the location of an assisting UE 102-2 to 102-4 based on location information received from the assisting UE 102-2 to 102-4. In another example, the coordinating UE 102-1 determines the location of an assisting UE 102-2 to 102-4 by determining observed time difference of arrival (OTDoA), observed angular different of arrival (OADoA), observed angular different of departure (OADoD), and the like of signals received from the assisting UEs 102-2 to 102-4.

Alternatively, or additionally, the coordinating UE 102-2 can perform direct path interference cancelation using one or more methods such as the Extensive Cancelling Algorithm, Least Mean Squares filtering, Recursive Least Squares filtering, Normalized Least Mean Squares filtering, Fast Block Mean Squares filter, Wiener filtering, and the like. In at least some embodiments, one or more of the assisting UEs 102-2 to 102-4 performs interference cancelation operations on received radar signals 118 using, for example, one or more of the techniques described above. In these embodiments, the RX radar signal samples 124-2, 124-3 received by the coordinating UE 102-1 from one or more assisting UEs 102-2 to 102-4 already have direct path interference removed. or reduced The assisting UEs 102-2 to 102-4 can determine if local interference cancelation is to be performed based on their respective TX and RX configurations 114, 116. In some embodiments, the coordinating UE 102-1 generates (or is provided) a mapping of known objects and their locations based on historic object location information 126. The coordinating UE 102-1 can utilize the locations of the known objects during the interference cancelation operations described above to remove interference caused by such objects during coordinated radar sensing.

The coordinating UE 102-1 processes the (filtered) radar signal samples 124 and determines 426 object location information 126 for one or more objects 122. For example, in at least some embodiments, object location information 126 includes a determined/estimated distance between the object 122 and one or more of the assisting UEs 102-2 to 102-4. The coordinating UE 102-1 can determine an object's distance using various methods. In one example, the coordinating UE 102-1 utilizes time-of-flight to determine the distance of an object 122 from one of the assisting UEs 102-2 to 102-4. In this example, the coordinating UE 102-1 measures the time interval between transmission of the radar signal 118 by the second UE 102-2 and reception of the reflected radar signal 118-2 by, for example, the third UE 102-3.

The coordinating UE 102-1 can determine the transmission time from the TX configuration 114 or receive the transmission time from the second UE 102-2. The coordinating UE 102-1, in at least some embodiments, receives reception time information from the third UE 102-3. The distance of the object from the third UE 102-2 is determined/estimated as one-half the round trip time multiplied by the speed of the signal. Alternatively, or additionally, the coordinating UE 102-1 determines the distance of an object 122 from one of the assisting UEs 102-2 to 102-4 using frequency modulation. In this example, the coordinating UE 102-1 compares the frequency of the reflected radar signal 118-2 received by, for example, the third UE 102-3 with the frequency of the transmitted radar signal 118-1 to determine a frequency shift. The coordinating UE 102-1 determines the distance between the object 122 and the third UE 102-3 based on the frequency shift between the transmitted radar signal 118-1 and the received reflected radar signal 118-2.

The coordinating UE 102-1, in at least some embodiments, determines the distance of the object 122 for each of the remaining assisting UEs, such as the fourth UE 102-4, in the UE-coordination set 401 using the techniques described above. In some embodiments, the coordinating UE 102-1 further refines the object location information 126 information determined for one or more assisting UEs 102-2 to 102-4 (e.g., the third UE 102-3) using the object location information 126 determined for other UEs 102 (e.g., the fourth UE 102-4) of the assisting UEs 102-2 to 102-4. Object location 126, in at least some embodiments, is stored at the coordinating UE 102-1, transmitted to the base station 104, transmitted to one or more of the assisting UEs 102-2 to 102-4, transmitted to other UEs or devices, provided to one or more applications, and the like. It should be understood that other information such as the speed of an object can be determined by the One or more assisting UEs 102-2 to 102-4, in at least some embodiments, also perform object detection in addition to, or in place of, the coordinating UE 102-1 performing object detection. An assisting UE 102-2 to 102-4 can utilize the techniques described above with respect to the coordinating UE 102-1 for determining object location information 126. For example, the third UE 102-3 determines/estimates the distance of an object 122 from the second (TX) UE 102-2, determines/estimates the distance of an object 122 from the third UE 102-3; determines/estimates a combined distance of the distance of an object 122 from the second (TX) UE 102-2 and the third UE 102-; a combination thereof; and the like. The assisting UEs 102-2 to 102-4 can transmit their object location information 126 to each other and the coordinating UE 102-2 to further refine their object location information. In at least some embodiment, the assisting UEs 102-2 to 102-4 determine to perform object detection based on their respective TX and RX configurations 114, 116.

The coordinating UE 102-1 initiates another iteration 460 of the coordinating radar sensing instance by configuring 426 the assisting UEs 102-2 to 102-4 according to a new configuration 112. For example, the coordinating UE 102-1 transmits a new TX configuration 114 and a new RX configuration 116 to the assisting UEs 102-2 to 102-4, similar to the operations previously discussed with respect to block 406 and block 408. However, in this iteration 460, the coordinating UE 102-1 has selected the third UE 102-3 as the TX UE, and the second UE 102-2 and the fourth UE 102-4 as the RX UEs. The third UE 102-3, in at least some embodiments, is configured to utilize the same waveform as the second UE 102-2 in the previous iteration 450 for transmitting the radar signal 118. However, in other embodiments, the third UE 102-3 is configured to utilize a different waveform than the second UE 102-2 in the previous iteration 450 for transmitting the radar signal 118. If subsequent iterations 460 of the coordinated radar sensing instance were configured prior to the first iteration 450 being performed, the coordinating UE 102-1 is not required to perform the configuration operations 426. The assisting UEs 102-2 to 102-4, for example, can self-reconfigure based on the previous TX and RX configurations 114, 116 received from the coordinating UE 102-1 prior to the first iteration 450.

The assisting UEs 102-2 to 102-4 receive and implement 428 (illustrated as 428-1 to 428-3) their respective TX configuration 114 and RX configuration 116. The implementation of the TX configuration 114 and RX configuration 116 configures the third UE 102-3 for radar transmission and the second UE 102-2 and fourth UE 102-4 for radar detection/sensing. The third UE-102-3 determines that an object detection trigger has occurred and, in response, transmits 430 a radar signal 118-1 based on the TX configuration 116 similar to the operations previously discussed with respect to block 412.

The second UE 102-2 and the fourth UE 102-4 operate in a radar signal receiving mode and receive 432 (illustrated as 432-1 and 432-2) the transmitted radar signal 118 similar to the operations previously discussed with respect to block 414. One or more of the second UE 102-2, third UE 102-3, and fourth UE 102-4 generate 434 to 438 radar signal samples 124 and transmit these samples 124 to the first UE 102-1 for processing similar to the operations previously described with respect to blocks 416 to 420. The coordinating UE 102-1 receives the TX radar signal samples 124-1 and RX radar signal samples 124-2, 124-3 from the assisting UEs 102-2 to 104, and performs operations to cancel 440 (remove or reduce) interference from the radar signal samples 124 similar to the operation previously described with respect to block 422. The coordinating UE 102-1 processes the (filtered) radar signal samples 124, determines new object location information 126 for one or more objects 122, and uses the new object location information 126 to refine 442 the objection location information 126 determined in the one or more previous iterations 450. The coordinating UE 102-1 determines the new object location information 126 using techniques similar to those previously described with respect to block 424. In some embodiments, further refining the objection location information 126 includes determining a more accurate distance of the object 122 from one or more of the assisting UEs 102-2 to 102-4, determining a distance of the object 122 from one or more of additional UEs of the assisting UEs 102-2 to 102-4, and the like. Any additional iterations of the coordinated radar sensing instance are subsequently performed in a similar manner.

Figure 6:
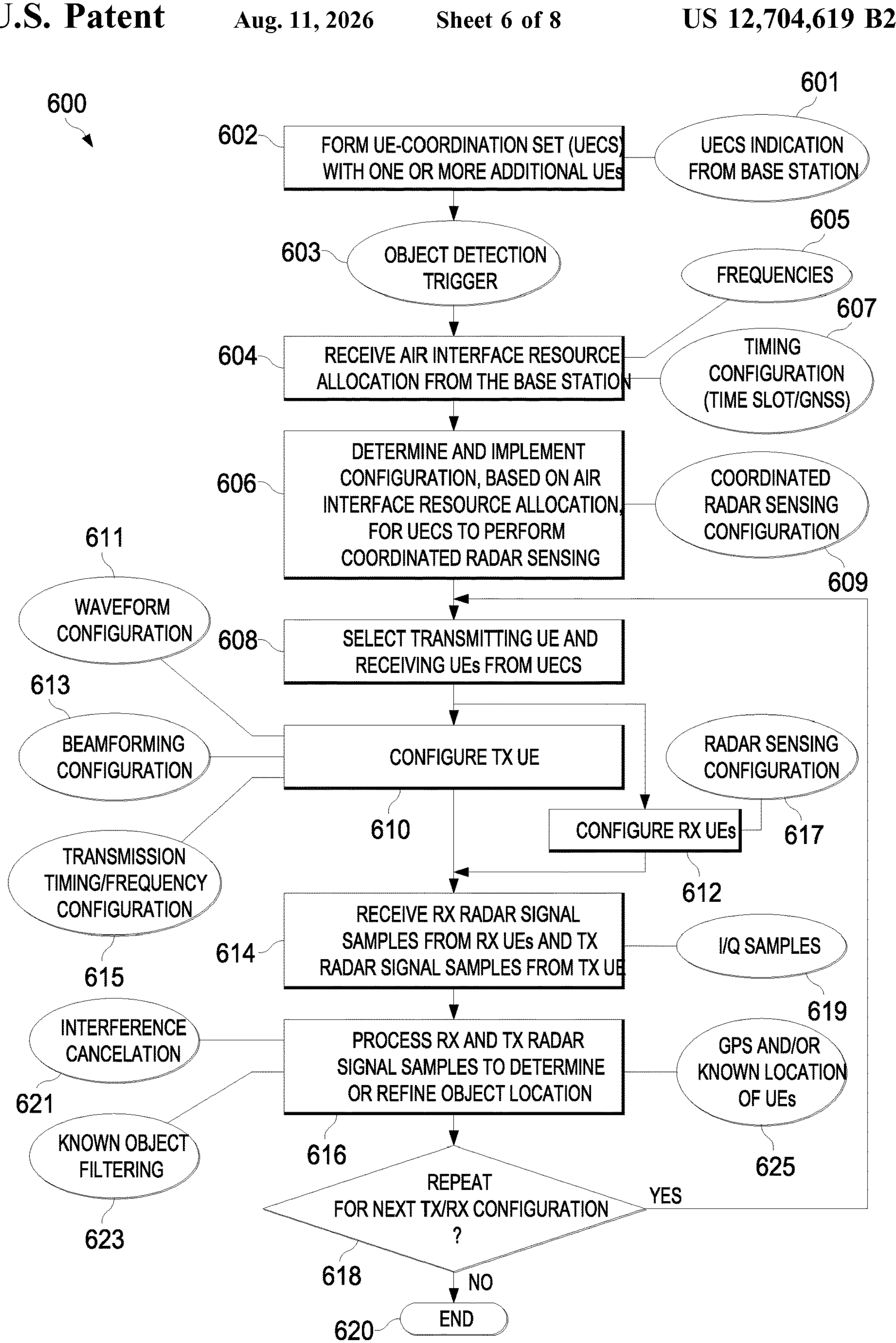
FIG. 6 is a flow diagram illustrating an example method for coordinated radar sensing by a coordinating UE of the selected set of UEs of FIG. 1 in accordance with some embodiments.

FIG. 6 illustrates, in flow chart form, one example method 600 of a coordinating UE 102-1 in a UE coordination set 401 performing coordinated radar sensing for object detection. The techniques described for FIG. 6 have been previously discussed in detail with respect to FIG. 1 FIG. 4, and FIG. 5. The method 600 is initiated in response to the coordinating UE 102-1 receiving an indication 601 from the base station 104 to form a UE-coordination set 401 for radar sensing. Responsive to the coordinating UE 102-1 receiving the indication 601 to form a UE-coordination set 401, the coordinating UE 102-1 forms 602 a UE-coordination set 401 with at least one additional UE 102 to perform coordinated radar sensing. One or more object detection triggers 603 occur, and the coordinating UE 102-1 receives 604 an allocation 110 of air interface resources from the base station 104. An allocation 110, in at least some embodiments, includes a frequency allocation 605, a transmission timing allocation 607 for transmitting/receiving a radar signal, and the like. It should be understood that the object detection trigger 603 can occur later in the flow.

The coordinating UE 102-1 determines and implements 606 a configuration 609 based on the allocation 110 received from the base station 104 for performing at least a first iteration 450 of coordinated radar sensing. The coordinating UE 102-1 selects 608 a transmitting UE (TX UE 102-2) and receiving UEs (RX UE 102-3 and RX UE 102-4) from the UE-coordination set 401. The coordinating UE 102-1 configures 610 the TX UE 102-2 and configures 612 RX UEs 102-3 and 102-4 based on the configuration 112 determined at block 606. For example, the coordinating UE 102-1 configures the TX UE 102-2 with a waveform configuration 609, a beamforming configuration 611, a radar transmission and frequency configuration 613, and the like. The coordinating UE 102-1 configures the RX UEs 102-3, 102-4 with, for example, a radar sensing configuration 615 that can include the waveform configuration 609, the beamforming configuration 611, the radar transmission and frequency configuration 613, and the like.

The coordinating UE 102-1 receives 614 TX radar signal samples 124-1 from the TX UE 102-2 and RX radar signal samples 124-2, 124-3 from the RX UEs 102-3, 102-4 based on the TX UE 102-2 transmitting a radar signal. In at least some embodiments, the radar signal samples 124 includes I/Q samples 617. The coordinating UE 102-1 processes the TX radar signal samples 124-1 and RX radar signal samples 124-2, 124-3 to determine and/or refine 616 object location information 126. For example, the coordinating UE 102-1 can perform interference cancelation 619, known object filtering 621 to remove interference from the TX radar signal samples 124-1 and RX radar signal samples 124-2, 124-3. In at least some embodiments, known object filtering 621 includes identifying an expected reflected radar signal 118 associated with a known object and canceling the expected reflected radar signal 118 from the RX radar signal samples 124-2, 124-3. In another example, the coordinating UE 102-1 utilizes Global Positioning System (GPS) coordinates and/or known locations 623 of the TX UE 102-2 and RX UEs 102-3, 102-4 to supplement the TX radar signal samples 124-1 and RX radar signal samples 124-2, 124-3 when determining object location information 126. The coordinating UE 102-1 determines 618 if the UE-coordination set 401 is to perform another iteration 460 of coordinated radar sensing. If the UE-coordination set 401 is to perform at least one additional iteration 460 of coordinated radar sensing, the control returns to block 608. If the UE-coordination set 401 will not perform any additional iterations 460 of coordinated radar sensing, the process ends 620.

Figure 7:
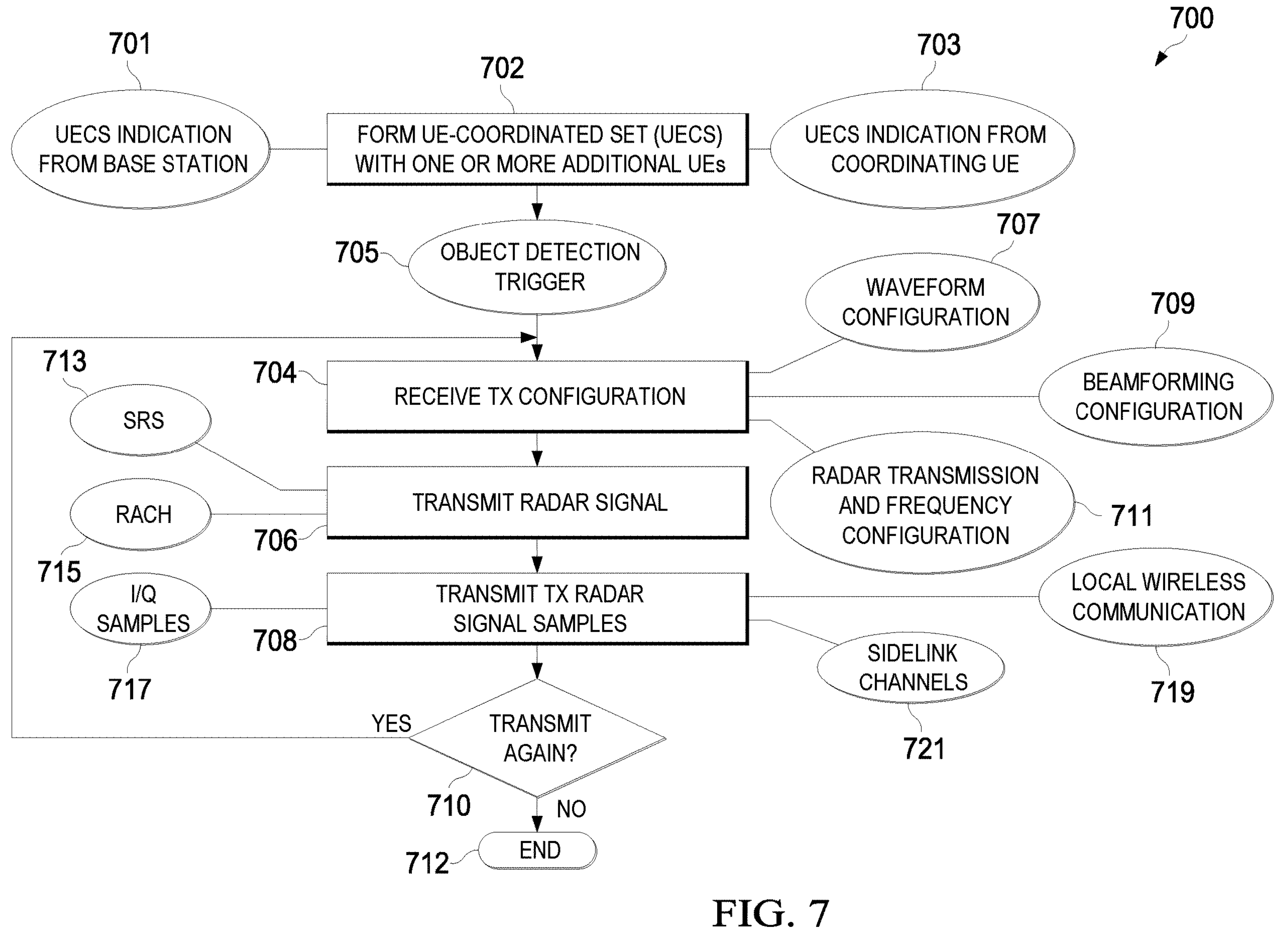
FIG. 7 is a flow diagram illustrating an example method for coordinated radar sensing by a transmitting UE of the selected set of UEs of FIG. 1 in accordance with some embodiments.

FIG. 7 illustrates, in flow chart form, one example method 700 of a TX UE 102-2 in a UE coordination set 401 performing coordinated radar sensing for object detection. The techniques described for FIG. 7 have been previously discussed in detail with respect to FIG. 1 FIG. 4, and FIG. 5. The method 700 is initiated in response to the TX UE 102-2 receiving an indication 701 from the base station 104 or an indication 703 from the coordinating UE 102-1 to form a UE-coordination set 401. Responsive to the TX UE 102-2 receiving the indication 701 or 703 to form a UE-coordination set 401, the TX UE 102-2 forms 702 a UE-coordination set 401 with at least one additional UE 102 to perform coordinated radar sensing. One or more object detection triggers 705 occur, and the TX UE 102-2 receives 704 a TX configuration 114 from the coordinating UE 102-1 (or base station 104) for at least a first iteration 450 of coordinated radar sensing. The TX configuration 114, in at least some embodiments, includes a waveform configuration 707, a beamforming configuration 709, a radar transmission and frequency configuration 711, and the like.

The TX UE 102-2 transmits 706 a radar signal 118-1 based on the TX configuration 114. In at least some embodiments, the TX UE 102-2 can use any waveform having satisfactory self-correlation properties for the radar signal. In one example, the radar signal is signal already scheduled to be transmitted by the TX UE 102-2, such as an SRS 713 or a RACH signal 715. The TX UE 102-2 generates and transmits 708 TX radar signal samples 124-1 of the transmitted radar signal 118-1 to the coordinating UE 102-1. In at least some embodiments, TX radar signal samples 124-1 include I/Q samples 717. The TX UE 102-2, in at least some embodiments, uses a local wireless network connection 719, a sidelink channel 721, and the like to transmit the TX radar signal samples 124-1 to the coordinating UE 102-1. The TX UE 102-2 determines 710 if another radar signal is to be transmitted. If at least one additional radar signal is to be transmitted, the control returns to block 704. The TX UE 102-2 then receives a new TX configuration 114 or an RX configuration 116 for operating in an RX mode. However, in some embodiments, the TX UE 102-2 already has a configuration for the next iteration 460 and does not receive a new configuration 114 (or 116). If no additional radar signals are to be transmitted, the process ends 712.

Figure 8:
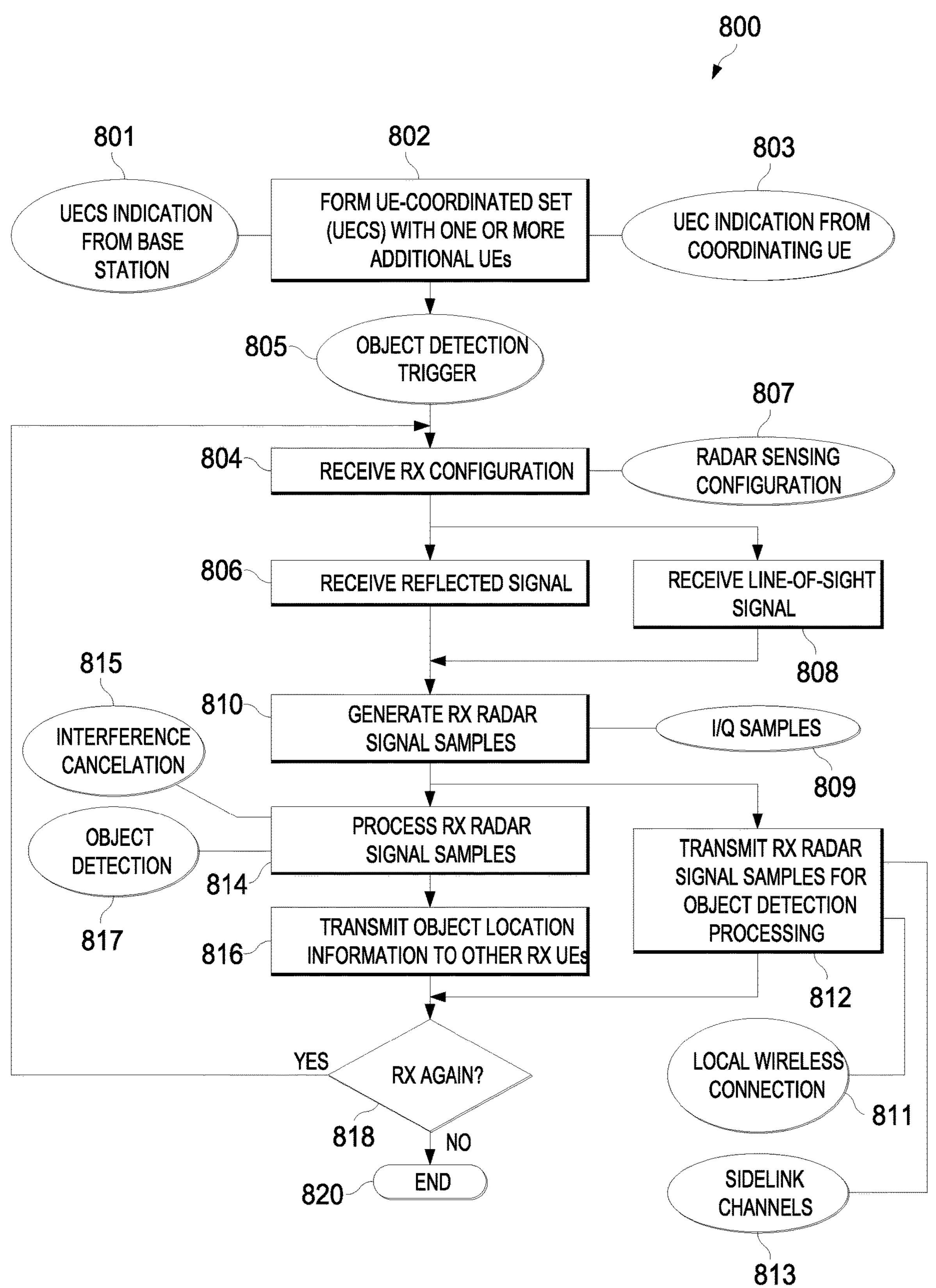
FIG. 8 is a flow diagram illustrating an example method for coordinated radar sensing by a receiving UE of the selected set of UEs of FIG. 1 in accordance with some embodiments.

FIG. 8 illustrates, in flow chart form, one example method 800 of an RX UE 102-3 in a UE coordination set 401 performing coordinated radar sensing for object detection. The techniques described for FIG. 8 have been previously discussed in detail with respect to FIG. 1, FIG. 4, and FIG. 5. The method 800 is initiated in response to the RX UE 102-3 receiving an indication 801 from the base station 104 or an indication 803 from the coordinating UE 102-1 to form a UE-coordination set 401. Responsive to the RX UE 102-3 receiving the indication 801 or 803 to form a UE-coordination set 401, the RX UE 102-3 forms 802 a UE-coordination set 401 with at least one additional UE 102 to perform coordinated radar sensing. One or more object detection triggers 805 occur, and the RX UE 102-3 receives 804 an RX configuration 116 from the coordinating UE 102-1 (or base station 104) for at least a first iteration 450 of coordinated radar sensing. The RX configuration 116, in at least some embodiments, includes a radar sensing configuration 807. The radar sensing configuration 807 includes, for example, the waveform configuration 509, the beamforming configuration 511, the radar transmission and frequency configuration 513, and the like. The RX UE 102-3 receives 806 a reflected radar signal 118-2 and receives 808 a LOS radar signal 118-4 in response to the TX UE 102-1 transmitting a radar signal 118-1.

The RX UE 102-3 generates 810 RX radar signal samples 124-2 of the received radar signals 118-2, 118-4. In at least some embodiments, RX radar signal samples 124-2 include I/Q samples 809. The RX UE 102-3 transmits 812 the RX radar signal samples 124-2 to at least one of the coordinating UE 102-1 or one or more other RX UEs 102-4. In at least some embodiments, the RX UE 102-3 uses a local wireless network connection 811, a sidelink channel 813, and the like to transmit the RX radar signal samples 124-2 to the coordinating UE 102-1 or other RX UEs 102-3. Additionally, or alternatively, the RX UE 102-3 processes 814 the RX radar signal samples 124-2. For example, the RX UE 102-3 performs interference cancelation 815 for the RX radar signal samples 124-2, performs object detection 817 using the RX radar signal samples 124-2, and the like. If the RX UE 102-3 performed object detection 817, the RX UE 102-3 transmits 816 object location information 126 to one or more other RX UEs 102-4. The RX UE 102-3 determines 818 if another radar signal is to be received. If at least one additional radar signal is to be received, the control returns to block 804. The RX UE 102-3 then receives a new RX configuration 116 or a TX configuration 114 for operating in a TX. However, in some embodiments, the RX UE 102-3 already has a configuration for the next iteration 460 and does not receive a new configuration 116 (or 114). If no additional radar signals are to be received, the process ends 820.

In some embodiments, certain aspects of the techniques described above are implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium can be in source code, assembly language code, object code, or another instruction format that is interpreted or otherwise executable by one or more processors.

A computer-readable storage medium includes any storage medium or combination of storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any features that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, by a first user equipment (UE) of a plurality of UEs in a cellular network, comprising:

configuring, based on a configuration for coordinating the plurality of UEs to detect one or more objects, a second UE of the plurality of UEs to transmit, as a first radar signal, either a Sounding Reference Signal (SRS) or a Random Access Channel (RACH) signal utilized by the second UE for cellular signaling;

sending, to a third UE of the plurality of UEs, a radar detection configuration message identifying one or more attributes associated with the first radar signal;

receiving, from the third UE, first radar signal samples based on the third UE receiving the first radar signal in a plurality of reflection states;

filtering the first radar signal samples to remove samples associated with the third UE receiving the first radar signal directly from the second UE; and responsive to filtering the first radar signal samples, determining object location information based on at least the filtered first radar signal samples.

2. The method of claim 1, wherein a first reflection state of the plurality of reflection states is a direct reception state where the third UE receives the first radar signal directly from the second UE, and wherein a second reflection state of the plurality of reflection states is a reflected state where the third UE receives the first radar signal reflected by one or more objects.

3. The method according to claim 1, further comprising at least one of:

receiving a first portion of the configuration from a base station; or generating a second portion of the configuration locally at the first UE.

4. The method according to claim 1, further comprising:

determining the configuration based on:

receiving an air interface resource allocation from a base station;

selecting a subset of air interface resources from the air interface resource allocation for transmission and reception of the first radar signal; and determining a waveform for the first radar signal.

5. The method according to claim 1, wherein configuring the second UE to transmit the first radar signal further comprises sending a message to the second UE identifying a waveform to be utilized as the first radar signal and further identifying transmission parameters for transmitting the first radar signal.

6. The method according to claim 1, wherein the radar detection configuration message identifies a beamforming configuration to be utilized by the third UE.

7. The method according to claim 1, further comprising:

receiving, from the second UE, second radar signal samples associated with the first radar signal transmitted by the second UE, wherein filtering the first radar signal samples comprises canceling the second radar signal samples from the first radar signal samples.

8. The method according to claim 7, further comprising:

configuring a fourth UE of the plurality of UEs to detect the first radar signal;

receiving, from the fourth UE, third radar signal samples based on the fourth UE receiving the first radar signal; and refining the object location information based on the second radar signal samples.

9. The method according to claim 7, further comprising:

configuring a fourth UE of the plurality of UEs to transmit a second radar signal;

receiving, from the third UE, fourth radar signal samples based on the third UE receiving the second radar signal in a plurality of reflection states; and refining the object location information based on the second radar signal samples.

10. The method according to claim 1, further comprising:

configuring the second UE to detect a second radar signal;

configuring the third UE to transmit the second radar signal;

receiving, from the second UE, third radar signal samples based on the second UE receiving the second radar signal; and refining the object location information based on the third radar signal samples.

11. The method according to claim 1, wherein one of: the first UE and the third UE are a same user equipment; or the third UE is a different user equipment from the first UE and the second UE.

12. A first UE including a wireless interface and a processor coupled to the wireless interface and configured to implement a method according to claim 1.

13. The method of claim 1, wherein the one or more attributes include at least one of: a waveform attribute of the first radar signal or a timing attribute associated with a transmission of the first radar signal.

* * * * *